United States Patent
Hsieh et al.

(10) Patent No.: US 10,187,461 B2
(45) Date of Patent: *Jan. 22, 2019

(54) CONFIGURING A SYSTEM TO COLLECT AND AGGREGATE DATASETS

(71) Applicant: Cloudera, Inc., Palo Alto, CA (US)

(72) Inventors: Jonathan Ming-Cyn Hsieh, San Francisco, CA (US); Henry Noel Robinson, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/098,198

(22) Filed: Apr. 13, 2016

(65) Prior Publication Data

US 2016/0226968 A1    Aug. 4, 2016

Related U.S. Application Data

(63) Continuation of application No. 12/877,903, filed on Sep. 8, 2010, now Pat. No. 9,317,572.

(60) Provisional application No. 61/319,816, filed on Mar. 31, 2010.

(51) Int. Cl.
| | |
|---|---|
| *H04L 29/08* | (2006.01) |
| *G06F 17/30* | (2006.01) |
| *G06F 11/20* | (2006.01) |
| *H04L 12/24* | (2006.01) |
| *G06F 11/34* | (2006.01) |

(52) U.S. Cl.
CPC ...... *H04L 67/1042* (2013.01); *G06F 11/2023* (2013.01); *G06F 17/30563* (2013.01); *H04L 41/12* (2013.01); *H04L 67/1087* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 5,325,522 A | 6/1994 | Vaughn | |
| 5,825,877 A | 10/1998 | Dan et al. | |
| 6,542,930 B1 * | 4/2003 | Auvenshine | G06F 17/30067 707/E17.01 |
| 6,651,242 B1 * | 11/2003 | Hebbagodi | G06F 9/4881 714/2 |
| 6,678,828 B1 | 1/2004 | Pham et al. | |
| 6,687,847 B1 * | 2/2004 | Aguilera | G06F 11/0715 714/15 |
| 6,931,530 B2 | 8/2005 | Pham et al. | |
| 7,031,981 B1 * | 4/2006 | DeLuca | G06F 3/0481 |

(Continued)

OTHER PUBLICATIONS

Babaoglu, O., and K. Marzullo, "Consistent global states of distributed systems: Fundamental concepts and mechanisms," Distributed Systems, 53 pages, Jan. 1993.

(Continued)

*Primary Examiner* — Backhean Tiv
(74) *Attorney, Agent, or Firm* — Perkins Coie LLP

(57) ABSTRACT

Methods for configuring a system to collect and aggregate datasets are disclosed. One embodiment includes, identifying a data source in the system from where dataset is to be collected, configuring a machine in the system that generates the dataset to be collected, to send the dataset to the data source, identifying an arrival location where the dataset that is collected is to be aggregated or written, and/or configuring an agent node by specifying a source for the agent node as the data source in the system and specifying a sink for the agent node as the arrival location.

50 Claims, 26 Drawing Sheets

(56) References Cited

U.S. PATENT DOCUMENTS

| | | | |
|---|---|---|---|
| 7,069,497 B1 | 6/2006 | Desai | |
| 7,107,323 B2* | 9/2006 | Hara | G06F 17/30082 707/E17.01 |
| 7,143,288 B2 | 11/2006 | Pham et al. | |
| 7,225,258 B2 | 5/2007 | Orcutt et al. | |
| 7,234,072 B2 | 6/2007 | Esfahany et al. | |
| 7,325,041 B2* | 1/2008 | Hara | G06F 17/30082 707/E17.01 |
| 7,392,421 B1 | 6/2008 | Bloomstein et al. | |
| 7,457,872 B2 | 11/2008 | Aton et al. | |
| 7,487,228 B1* | 2/2009 | Preslan | G06F 17/30067 709/218 |
| 7,496,829 B2 | 2/2009 | Rubin et al. | |
| 7,577,667 B2 | 8/2009 | Zane et al. | |
| 7,620,698 B2* | 11/2009 | Hara | G06F 17/30194 709/218 |
| 7,631,034 B1* | 12/2009 | Haustein | G06F 9/505 709/201 |
| 7,631,214 B2 | 12/2009 | Bockhold et al. | |
| 7,640,512 B1 | 12/2009 | Appling | |
| 7,653,668 B1* | 1/2010 | Shelat | G06F 11/2094 707/610 |
| 7,664,729 B2 | 2/2010 | Klein et al. | |
| 7,685,109 B1* | 3/2010 | Ransil | G06F 17/30336 707/999.003 |
| 7,698,321 B2 | 4/2010 | Hackworth | |
| 7,702,610 B2 | 4/2010 | Zane et al. | |
| 7,734,961 B2 | 6/2010 | Almoustafa et al. | |
| 7,788,671 B2 | 8/2010 | Black-Ziegelbein et al. | |
| 7,818,313 B1 | 10/2010 | Tsimelzon et al. | |
| 7,827,136 B1 | 11/2010 | Wang et al. | |
| 7,831,991 B1* | 11/2010 | Kiraly | G08B 27/005 709/219 |
| 7,864,834 B1* | 1/2011 | Wu | G01R 31/31708 375/226 |
| 7,904,809 B2 | 3/2011 | Corning et al. | |
| 7,937,482 B1* | 5/2011 | Vermeulen | G06F 11/1425 709/229 |
| 7,970,861 B2* | 6/2011 | Simitci | G06F 3/0611 709/217 |
| 8,024,560 B1 | 9/2011 | Alten | |
| 8,069,190 B2 | 11/2011 | McColl et al. | |
| 8,069,267 B2 | 11/2011 | Powers-Boyle et al. | |
| 8,108,338 B2* | 1/2012 | Castro | G06F 17/30575 707/610 |
| 8,108,771 B2* | 1/2012 | Chijiiwa | G06Q 10/10 715/234 |
| 8,306,919 B2 | 11/2012 | Sakamura et al. | |
| 8,311,980 B2* | 11/2012 | Saito | G06F 17/30212 707/610 |
| 8,364,728 B2 | 1/2013 | Gnanasambandam | |
| 8,468,244 B2 | 6/2013 | Redlich et al. | |
| 8,484,716 B1* | 7/2013 | Hodgson | H04L 63/02 726/11 |
| 8,560,639 B2* | 10/2013 | Murphy | G06F 11/1446 707/610 |
| 8,655,939 B2 | 2/2014 | Redlich et al. | |
| 8,667,267 B1 | 3/2014 | Garcia et al. | |
| 8,776,231 B2 | 7/2014 | Elovici et al. | |
| 8,788,815 B1 | 7/2014 | Garcia et al. | |
| 9,081,888 B2* | 7/2015 | Hsieh | G06F 11/3476 |
| 9,172,608 B2 | 10/2015 | Zeyliger et al. | |
| 9,201,910 B2 | 12/2015 | Hsieh et al. | |
| 9,317,572 B2* | 4/2016 | Hsieh | G06F 17/30563 |
| 2002/0055989 A1* | 5/2002 | Stringer-Calvert | H04L 12/4679 709/220 |
| 2002/0073322 A1 | 6/2002 | Park et al. | |
| 2002/0138762 A1* | 9/2002 | Horne | H04L 43/00 726/25 |
| 2002/0174194 A1* | 11/2002 | Mooney | H04L 51/36 709/219 |
| 2003/0051036 A1* | 3/2003 | Wang | H04L 29/06 709/227 |
| 2003/0055868 A1* | 3/2003 | Fletcher | G06F 8/20 709/201 |
| 2003/0093633 A1 | 5/2003 | Thiesfeld et al. | |
| 2004/0003322 A1 | 1/2004 | Collins et al. | |
| 2004/0049563 A1* | 3/2004 | Orcutt | H04L 29/06 709/223 |
| 2004/0059728 A1* | 3/2004 | Miller | G06F 17/30545 |
| 2004/0103166 A1* | 5/2004 | Bae | G06F 9/5061 709/217 |
| 2004/0172421 A1* | 9/2004 | Saito | G06F 17/30206 |
| 2004/0186832 A1 | 9/2004 | Jardin | |
| 2005/0071708 A1* | 3/2005 | Bartfai | G06F 11/2064 714/6.3 |
| 2005/0138111 A1* | 6/2005 | Aton | G06F 11/3476 709/201 |
| 2005/0171983 A1 | 8/2005 | Deo et al. | |
| 2005/0182749 A1 | 8/2005 | Matsui | |
| 2005/0198275 A1 | 9/2005 | D'Alo et al. | |
| 2006/0020854 A1* | 1/2006 | Cardona | G06F 11/2005 714/13 |
| 2006/0050877 A1 | 3/2006 | Nakamura | |
| 2006/0080417 A1* | 4/2006 | Boutboul | H04L 41/12 709/220 |
| 2006/0143453 A1 | 6/2006 | Imamoto et al. | |
| 2006/0156018 A1 | 7/2006 | Lauer et al. | |
| 2006/0247897 A1 | 11/2006 | Lin | |
| 2007/0100913 A1* | 5/2007 | Sumner | G06F 11/1453 |
| 2007/0113188 A1 | 5/2007 | Bales et al. | |
| 2007/0136442 A1 | 6/2007 | Palma et al. | |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0234115 A1 | 10/2007 | Saika | |
| 2007/0239819 A1* | 10/2007 | Woods | G06Q 30/02 709/201 |
| 2007/0255943 A1 | 11/2007 | Kern et al. | |
| 2007/0282988 A1* | 12/2007 | Bornhoevd | G06Q 10/00 709/223 |
| 2008/0140630 A1 | 6/2008 | Sato et al. | |
| 2008/0168135 A1 | 7/2008 | Redlich et al. | |
| 2008/0244307 A1 | 10/2008 | Dasari et al. | |
| 2008/0256486 A1 | 10/2008 | Hagiwara | |
| 2008/0263006 A1 | 10/2008 | Wolber et al. | |
| 2008/0276130 A1* | 11/2008 | Almoustafa | H04L 41/069 714/47.1 |
| 2008/0307181 A1 | 12/2008 | Kuszmaul et al. | |
| 2009/0013029 A1* | 1/2009 | Childress | H04L 67/1095 709/203 |
| 2009/0171999 A1* | 7/2009 | McColl | G06F 17/30539 |
| 2009/0177697 A1 | 7/2009 | Gao et al. | |
| 2009/0259838 A1 | 10/2009 | Lin | |
| 2009/0276311 A1* | 11/2009 | Pujet | G06Q 30/0251 705/14.52 |
| 2009/0300765 A1* | 12/2009 | Moskovitch | G06F 21/562 726/24 |
| 2009/0307783 A1 | 12/2009 | Maeda et al. | |
| 2010/0008509 A1 | 1/2010 | Matsushita et al. | |
| 2010/0010968 A1 | 1/2010 | Redlich et al. | |
| 2010/0070769 A1 | 3/2010 | Shima et al. | |
| 2010/0107048 A1 | 4/2010 | Takahara et al. | |
| 2010/0131817 A1 | 5/2010 | Kong et al. | |
| 2010/0179855 A1 | 7/2010 | Chen et al. | |
| 2010/0188689 A1* | 7/2010 | Gnanasambandam | G03G 15/5075 358/1.15 |
| 2010/0198972 A1 | 8/2010 | Umbehocker | |
| 2010/0287238 A1* | 11/2010 | Setton | H04N 21/4788 709/204 |
| 2010/0296652 A1 | 11/2010 | Nakayama et al. | |
| 2010/0299326 A1* | 11/2010 | Germaise | G06F 17/30867 707/728 |
| 2010/0306286 A1 | 12/2010 | Chiu et al. | |
| 2010/0325713 A1 | 12/2010 | Kurita et al. | |
| 2010/0332373 A1 | 12/2010 | Crabtree et al. | |

(56) References Cited

U.S. PATENT DOCUMENTS

| | | | |
|---|---|---|---|
| 2011/0044354 A1* | 2/2011 | Wei | H04L 41/0816 370/468 |
| 2011/0055578 A1 | 3/2011 | Resch | |
| 2011/0078549 A1 | 3/2011 | Thueringer et al. | |
| 2011/0119328 A1* | 5/2011 | Simitci | G06F 3/0611 709/203 |
| 2011/0173302 A1 | 7/2011 | Rider et al. | |
| 2011/0179160 A1 | 7/2011 | Liu et al. | |
| 2011/0236873 A1 | 9/2011 | Bowers | |
| 2011/0246816 A1 | 10/2011 | Hsieh et al. | |
| 2011/0246826 A1 | 10/2011 | Hsieh et al. | |
| 2011/0276396 A1 | 11/2011 | Rathod | |
| 2011/0276495 A1 | 11/2011 | Varadarajan et al. | |
| 2011/0302417 A1 | 12/2011 | Whillock et al. | |
| 2011/0307534 A1* | 12/2011 | Peng | G06F 17/30206 707/827 |
| 2012/0036357 A1 | 2/2012 | Struik | |
| 2012/0102072 A1* | 4/2012 | Jia | G06F 17/30197 707/803 |
| 2012/0130874 A1 | 5/2012 | Mane et al. | |
| 2012/0131341 A1 | 5/2012 | Mane et al. | |
| 2013/0031240 A1 | 1/2013 | Byzek | |
| 2013/0054976 A1 | 2/2013 | Brown et al. | |
| 2013/0304761 A1 | 11/2013 | Redlich et al. | |
| 2015/0039735 A1 | 2/2015 | Zeyliger et al. | |
| 2015/0317231 A1 | 11/2015 | Hsieh et al. | |
| 2016/0070760 A1 | 3/2016 | Hsieh et al. | |
| 2016/0275136 A1 | 9/2016 | Hsieh et al. | |

OTHER PUBLICATIONS

Cheng, Security Attack Safe Mobil and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pages, Aug. 2013.

Du et al., "A Pairwise Key Predistribution Scheme for Wireless Sensor Networks," ACM, May 2005, vol. 8 Issue 2, pp. 228-258.

Kim et al., Design and Implementation of a Private and Public Key Crypto Processor and Its Application to a Security System, IEEE, Feb. 2004, vol. 50, Issue 1, pp. 214-224.

Ko et al., "A Study of Encryption Algorithm for RFID tag (Seed: 8 Rounds × 64 bit block)," IEEE, s008, pp. 672-677.

Lamport, L., "Time, clocks, and the ordering of events in a distributed system," Communications of the ACM, vol. 21, No. 7, pp. 558-565, Jul. 1978.

Stoller, S.D., "Detecting global predicates in distributed systems with clocks," Distributed Computing, vol. 13, No. 2, pp. 85-98, Feb. 2000.

U.S. Appl. No. 12/877,878, filed Sep. 8, 2010, now U.S. Pat. No. 9,082,127 titled Collecting and Aggregating Datasets for Analysis.

U.S. Appl. No. 12/877,902, filed Sep. 8, 2010, titled Configuring a System to Collect and Aggregate Datasets.

U.S. Appl. No. 14/877,913, filed Sep. 8, 2010, now U.S. Pat. No. 9,081,888 titled Collecting and Aggregating Log Data With Fault Tolerance.

U.S. Appl. No. 14/796,812, filed Jul. 10, 2015, titled Collecting and Aggregating Log Data With Fault Tolerance.

U.S. Appl. No. 12/877,930, filed Sep. 8, 2010, now U.S. Pat. No. 8,812,457, titled Dynamically Processing an Event Using an Extensible Data Model.

U.S. Appl. No. 14/462,395, filed Aug. 18, 2014, now U.S. Pat. No. 9,201,910 titled Dynamically Processing an Event Using an Extensible Data Model.

U.S. Appl. No. 13/566,943, filed Aug. 3, 2012, now U.S. Pat. No. 9,172,943 titled Centralized Configuration and Monitoring of a Distributed Computing Cluster.

U.S. Appl. No. 14/509,300, filed Oct. 8, 2014, titled Centralized Configuration of a Distributed Computing Cluster.

\* cited by examiner

*FIG. 10A* master | config | raw commands

Flume Config

Configure a single node

Configure node:
or specify another node: [Choose from list ▼]
Source:
Sink:
[Submit]

Configure multiple nodes

[Submit]

*FIG. 10B*

| Flume Administration | × | + |

← → C ☆ ⛨ http://localhost:35862/flumeagent.jsp

✱ Flume - Task Bo... ✉ [CLOUDERA] Cre... ● Designing a hig...

LogicalNodeManager.blitzwing.sinkConfig  let autoBEChain := { lazyOpen => failChain}"{ lazyOpen => { stubbornAppend => %s } }"."tsink(\"localhost\
LogicalNodeManager.blitzwing.sourceConfig  ",35861)"}} in let autoDfoChain := { lazyOpen => let primary := failChain("{ lazyOpen => { stubbornAppend =>
LogicalNodeManager.blitzwing.version  %s } }","tsink(\"localhost",35861)"}) in < primary ? {diskFailover => { insistentOpen => primary } } >} in let
LogicalNodeManager.sink  autoE2EChain := { lazyOpen => { ackedWriteAhead => failChain("{ lazyOpen => { stubbornAppend => %s } }
  ","tsink(\"localhost", 35861)"}}} in [counterHistory("total",1000), multigrep("keywords", "truncated", "bit.ly", "reply") ]
  twitter
  Fri Mar 26 00:25:32 PST 2010
LogicalNodeManager.synth.LogicalNode.  LocalNodeManager
DelayDecorator.Fanout[0].total.report.legacy.  148
html LogicalNodeManager.synth.LogicalNode.  0         68
DelayDecorator.Fanout[0].total.sink  0
  total
LogicalNodeManager.synth.LogicalNode.  1804
DelayDecorator.Fanout[1].letters.report.
legacy.html LogicalNodeManager.synth.LogicalNode.
DelayDecorator.Fanout[1].letters.sink  0  7
LogicalNodeManager.synth.LogicalNode.
DelayDecorator.sink  1809 :: f,
LogicalNodeManager.synth.LogicalNode.  1822 :: g,
sink  1782 :: d,
LogicalNodeManager.synth.nodename  1791 :: e,        letters
LogicalNodeManager.synth.sink  1820 :: b,        Fanout
  1821 :: a,        DelayDecorator
LogicalNodeManager.synth.sinkConfig         synth
         synth
LogicalNodeManager.synth.sourceConfig  let autoBEChain := { lazyOpen => failChain}"{ lazyOpen => { stubbornAppend => %s
LogicalNodeManager.synth.version  } }","tsink(\"localhost", 35861)"}} in let autoDfoChain := { lazyOpen => let primary
System.os.arch  := failChain("{ lazyOpen => { stubbornAppend => %s } }","tsink(\"localhost",35861)")
System.os.cpus  in < primary ? {diskFailover => { insistentOpen => primary } } >} in let autoE2EChain
System.os.load  := { lazyOpen => { ackedWriteAhead => failChain("{ lazyOpen => { stubbornAppend
System.os.name  => %s } }","tsink(\"localhost",35861)"}}} in { delay(10) => [counterHistory("total",1000),
System.os.version  multigrep("letters", "a", "b", "c", "d", "e", "f", "g")]} }
System.sink  asciisynth(0,100)
sink  Fri Mar 26 00:29:23 PST 2010
  amd64
  2 "
  (long)4610470046527997870 (string "?  ?  x  ?  G  ?" (double)1.73
  Linux
  2.6.31-20-generic
  System
  FlumeNode

CONFIGURING A SYSTEM TO COLLECT AND AGGREGATE DATASETS

CLAIM OF PRIORITY

This application in a continuation of U.S. patent application Ser. No. 12/877,902, filed Sep. 8, 2010, entitled "CONFIGURING A SYSTEM TO COLLECT AND AGGREGATE DATASETS," which claims priority to U.S. Provisional Patent Application Ser. No. 61/319,816, filed on Mar. 31, 2010, entitled "CONFIGURING A SYSTEM TO COLLECT AND AGGREGATE DATASETS;" all of which are expressly incorporated by reference herein in their entireties.

BACKGROUND

Increasingly large amounts of data are generated with expanded user base of online applications such as social networks. Online activity of users interacting with one another, or with applications generates valuable information about users. Such data and analytics therein extracted can potentially provide service providers with useful information, for example, regarding traffic, content popularity, trends, etc. Additionally, advertisers can potentially glean information regarding user information and interests.

BRIEF DESCRIPTION OF THE DRAWINGS

FIG. 10A depicts a screenshot of an example user interface showing node status and configurations with node mappings.

FIG. 10B depicts a screenshot of an example user interface for configuring a node.

FIG. 10F depicts a screenshot of an example user interface showing statistics for a node.

DETAILED DESCRIPTION

Figure 1:
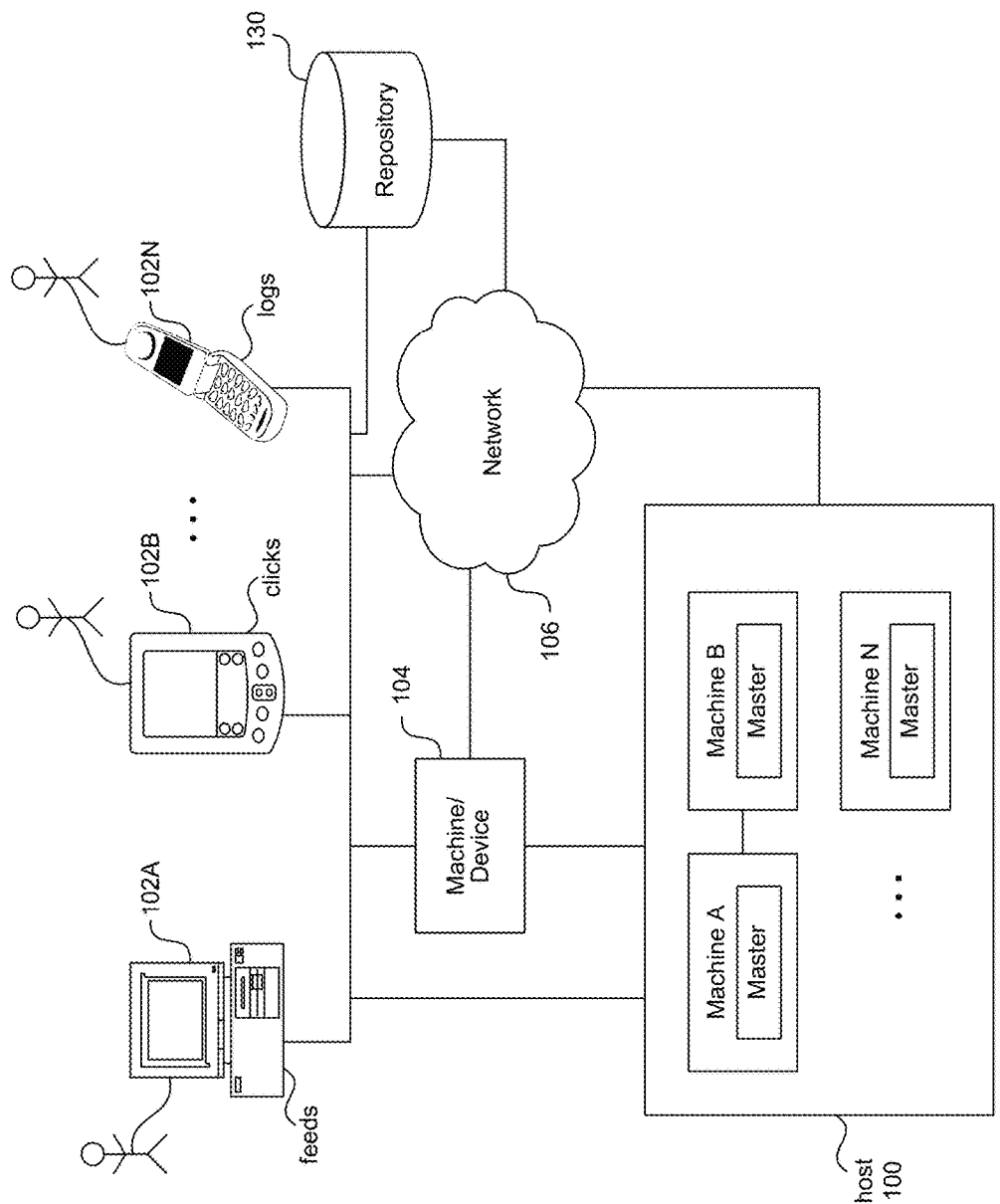
FIG. 1 illustrates a block diagram of client devices that generate datasets (log data) to be collected and aggregated for storage in the storage device via interacting nodes in various tiers, in some instances, through a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for configuring a system to collect aggregate datasets.

FIG. 1 illustrates a block diagram of client devices 102A-N that generate datasets (log data) to be collected and aggregated for storage in the storage device 108 via interacting nodes in various tiers, in some instances, through a network 106.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a thin-client device, an internet kiosk, a computer cluster, a mobile computing device such as a notebook, a laptop computer, a handheld computer, a mobile phone, a smart phone, a PDA, a Blackberry device, a Treo, and/or an iPhone, etc. In one embodiment, the client devices 102A-N are coupled to a network 106. In some embodiments, the client devices may be directly connected to one another.

In one embodiment, users interact with user devices 102A-N (e.g., machines or devices). As a results of the user interaction, the devices 102A-N can generate datasets such as log files to be collected and aggregated. The file can include logs, information, and other metadata about clicks, feeds, status updates, data from applications, and associated properties and attributes.

User devices 102A-N can have nodes executing or running thereon that collect the datasets that are user-generated or machine-generated, for example, based on user-interaction with applications or websites running on the devices. Such nodes can interact and/or communicate with one or more other nodes (e.g., either running on the same device/machine or another device/machine (e.g., machine/device 104) to facilitate collection and aggregation of datasets thus generated. In one embodiment, the datasets are eventually written to a file and stored, for example, in storage (e.g., repository 130) on a physical disk.

Additionally, functionalities and properties can be assigned to the nodes such that various analytics can be performed on the collected dataset and additional information can be extracted or embedded. The dataflow among nodes can be configured at a master. In one embodiment, the nodes executed on the machines 102 or 104 can contact the master(s) to obtain configuration information, which have been set by default or configured by a user The master can be executed on the same devices 102A-N, 104, or at the host device 100. One or multiple masters can be involved in the mapping of data flow among the nodes and various machines.

Some examples of architectural configurations among nodes, machines, and masters are illustrated and described with further reference to the example of FIG. 2-5. The functionalities of the nodes and configuration are described with further reference to the examples of FIG. 6-8.

The network 106, over which the client devices 102A-N, 104, host, and the nodes and masters therein communicate may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The repository 130 can store software, descriptive data, images, system information, drivers, collected datasets, aggregated datasets, log files, analytics of collected datasets, enriched datasets, etc. The repository may be managed by a database management system (DBMS), for example but not limited to, Oracle, DB2, Microsoft Access, Microsoft SQL Server, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. In one embodiment, the repository is managed by a distributed file system or network file system that allows access to files from multiple hosts/machines over a network. The distributed file system can include by way of example, the Hadoop Distributed File system (HDFS). Other file systems can be used as well, for example, through integration of Hadoop's interface which provides an abstraction layer for the file system. For example, a local file system where a node resides can be used. The HDFS native distributed file system can also be used. In addition, S3 (a remote file system hosted by Amazon web services), FTP, and KFS (Kosmos file system—another distributed file system) can also be used. Clients can also write to different file systems (NFS), or other file systems.

Figure 19:
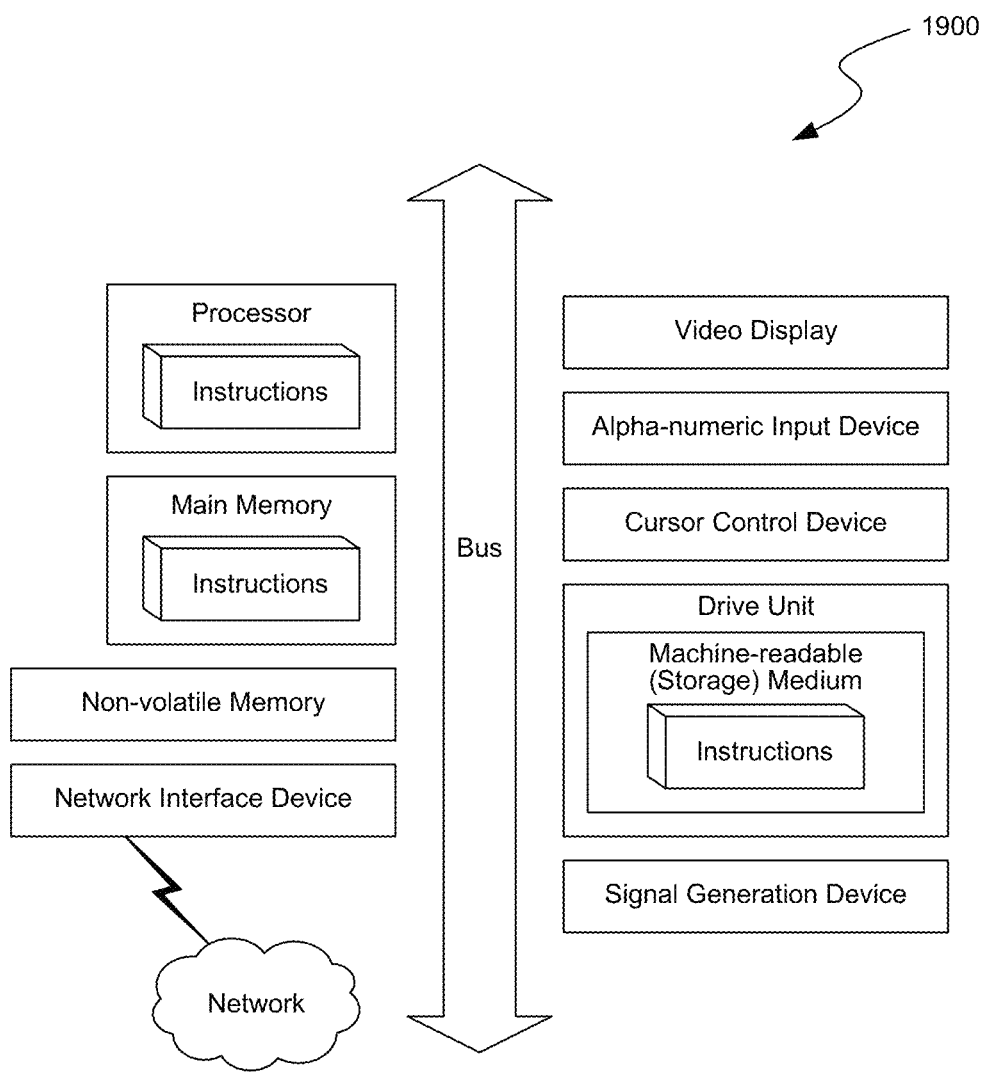
FIG. 19 shows a diagrammatic representation of a machine in the example form of a computer system within which a set of instructions, for causing the machine to perform any one or more of the methodologies discussed herein, may be executed.

In general, the user devices 102 and 104 are able to write files (e.g., files including by way of example, collected and aggregated datasets/logs/log files) to the repository 130, either through the network 106 or without utilizing the network 106. The host server 100 can be implemented on a known or convenient computer system, such as is illustrated in FIG. 19.

Figure 2A:
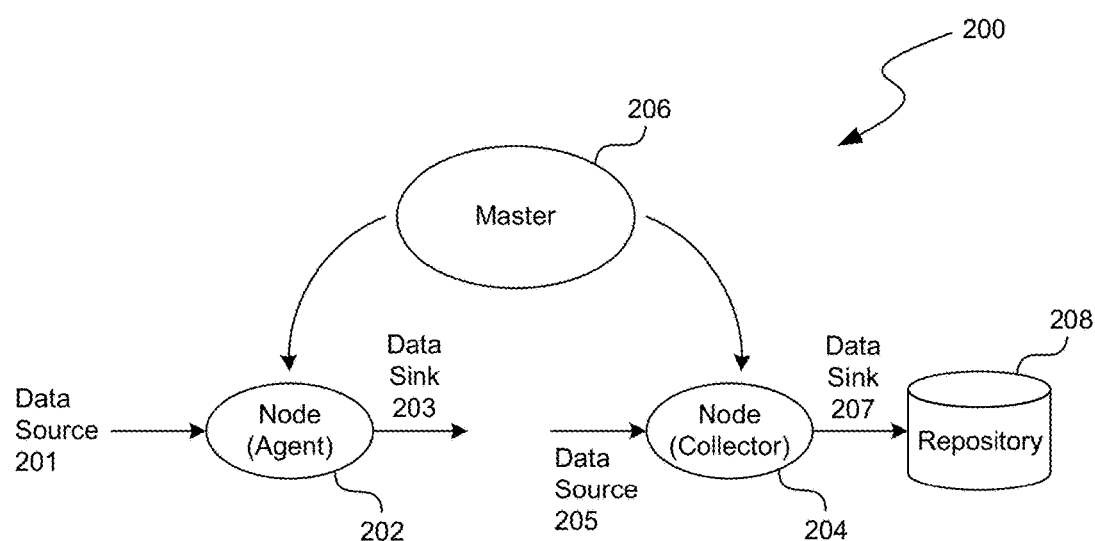
FIG. 2A depicts a diagram showing one example configuration of nodes that are controlled/configured by a master and dataflow therein from a data source to a data sink (e.g., storage).

FIG. 2A depicts a diagram showing one example configuration 200 of nodes 202 and 204 that are controlled/configured by a master 206 and dataflow therein from a data source 201 to a data sink 207 (e.g., repository 208).

In order to collect dataset on a machine for aggregation and to perform any analytics, the node 202 can be mapped to the data source 201 on the machine that generates that dataset. The dataset can include data, metadata, complex data, including logs of clicks, social networking sites, feeds, status updates, logs from local or remote applications, etc. The data source can include, by way of example, but not limitation, a syslog port, an incoming network connection, and an IRC channel, output from execution of a program, a text file. In addition, a data source can include a Hadpp sequence file formatted file.

The node 202 can map the data source 201 to a receiving location such as a data sink 203. In one embodiment, a master 206 controls the mapping of the data source 201 to the receiving location 203 via the node 202. In addition, data flow of the dataset from the data source 201 to the receiving location 203 is configurable and reconfigurable at the master 206 by a user (e.g., system administrator, developer, etc.). The node 202 can contact the master 206 to obtain its mapping/configuration information.

Having nodes contact the master 206 to obtain configuration information allows node configuration to dynamically change without having to login and to restart the daemon (e.g., a server process on a UNIX-based machine). The node's configuration can be changed to a new one without taking the system offline. In one embodiment, nodes are configured using a web interface to the master. Screenshots of example interfaces are illustrated with further reference to the example of FIG. 10.

In general, one or more masters can be implemented using one or more machines, as illustrated in subsequent figures. The master 206 can be executed on the machine on which the collected dataset is received or generated or one or more different machines. Different types of architectural configurations for the master 206 are illustrated in subsequent figures.

A receiving location, represented by data sink 203, can include, by way of example, not limitation, a network connection, a physical disk, a console, a text file. The receiving location can also include, a file in the Hadoop sequence file format, an HDFS path, a port, a monitoring or alerting application, and/or an IRC.

In general, the collected dataset from the data source 201 can be aggregated at the receiving location (data sink 203). The receiving location (e.g., or data sink 203) may further be mapped to node 204 (e.g., a collector node), where the dataset collected from the dataset can be aggregated. In some instances, analytics can be performed on the dataset upon collection at node 202 and/or aggregation at node 204. In one embodiment, the master 206 controls the functions/properties of the nodes 202 and/or 204.

For example, the nodes 202/204 (e.g., logical nodes) can be associated with properties and/or functions, including but not limited to, adding encryption or digital signature, performing batching/unbatching, performing compression/uncompression, generating a checksum of a dataset, performing sampling, performing benchmarking (e.g., by injecting benchmark tags). In addition, the analytic that are performed can include, feature extraction, filtering, transformation, generating aggregate counts, statistics, etc.

The node 204, in aggregating the dataset, can also be mapped to a data source 205 and a data sink 207, as controlled and configured at the master 206. To aggregate data collected by the node 202, the data source 205 of the node 204 can be mapped to the sink 203 of node 202.

Figure 6:
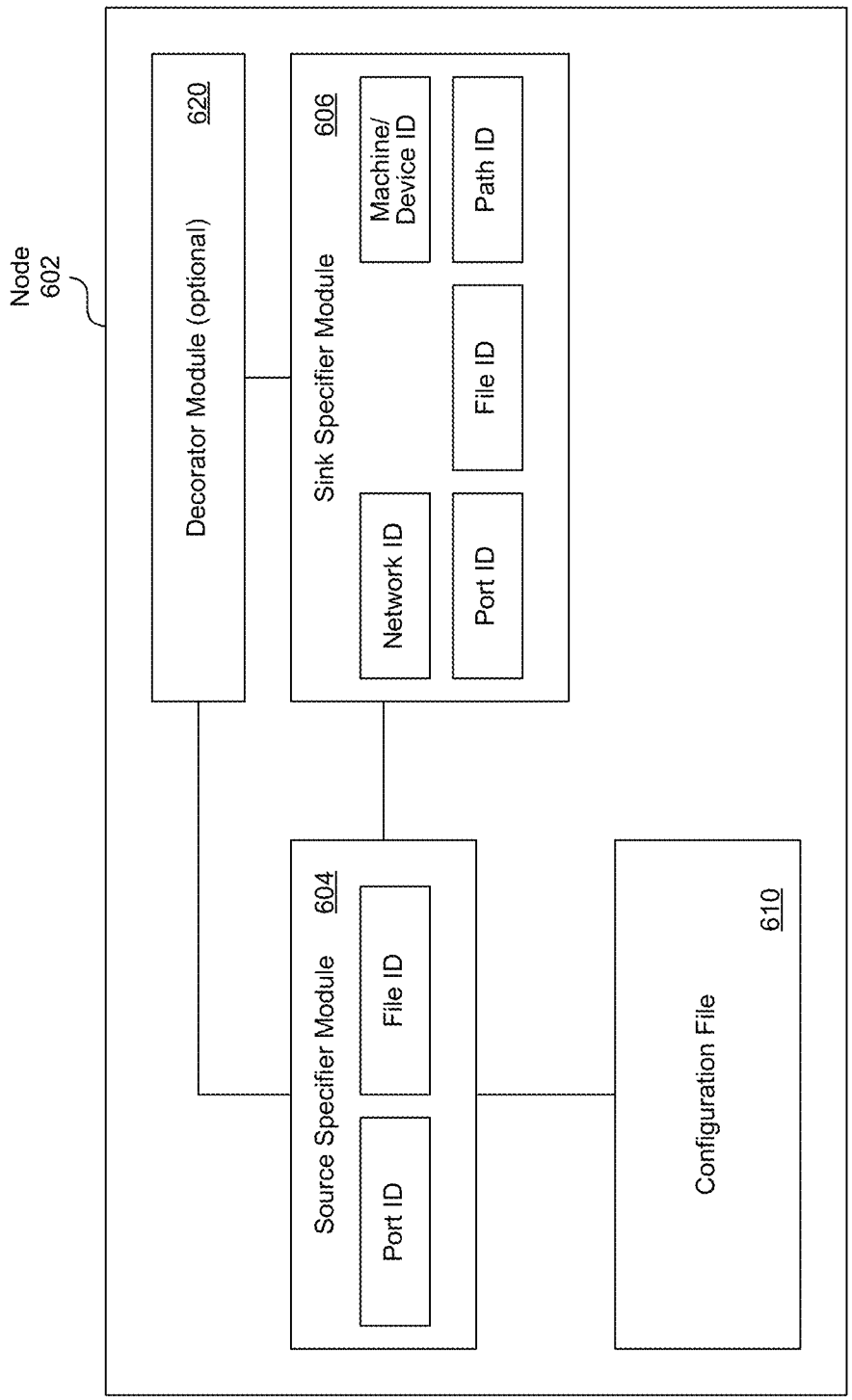
FIG. 6 depicts a block diagram illustrating example components of a node through which dataflow occur.
Figure 7:
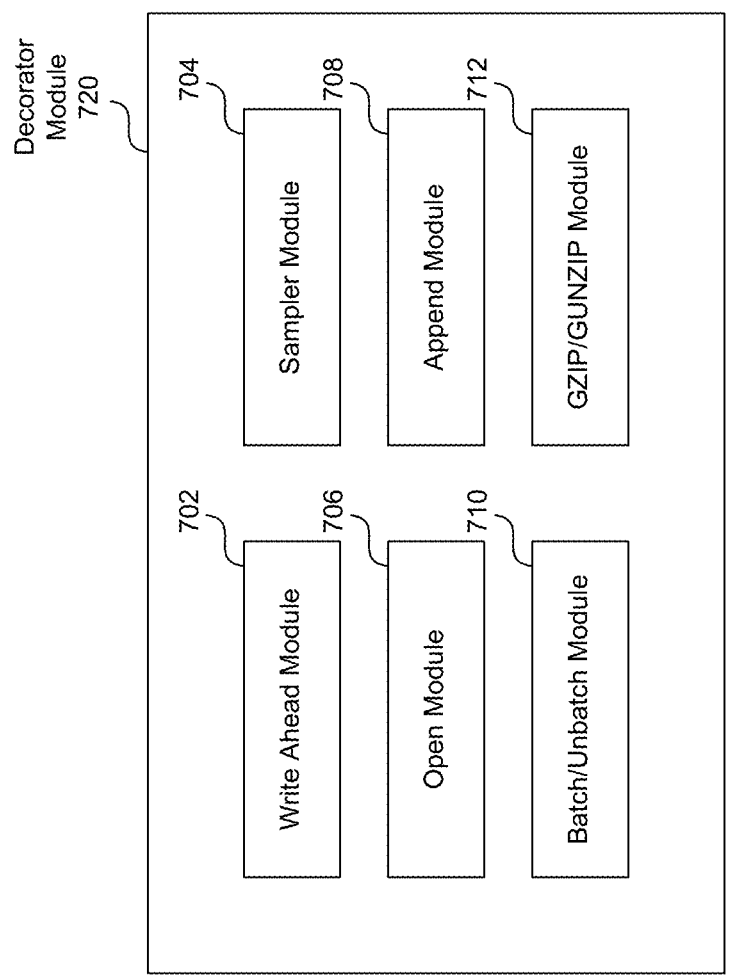
FIG. 7 depicts a block diagram illustrating example components of a decorator module in a node.

Additional functions and properties of nodes are illustrated with further reference to the example of FIG. 6-7.

In one embodiment, the node 204 (e.g., a collector node) writes the aggregated data to a storage location. The storage location can be localized or distributed among multiple machines and the dataset is stored redundantly. The data sink 207 of the node 204 can be mapped to a repository 208, by the master 206, for example. The repository 208 may be managed by a file system. The file system can be distributed (e.g., the Hadoop Distributed File System (HDFS)). Results of any analytics performed by nodes 202 and/or 204 can also be written to storage. Data/metadata extracted from the collected dataset may be written to storage 208 as well.

Figure 2B:
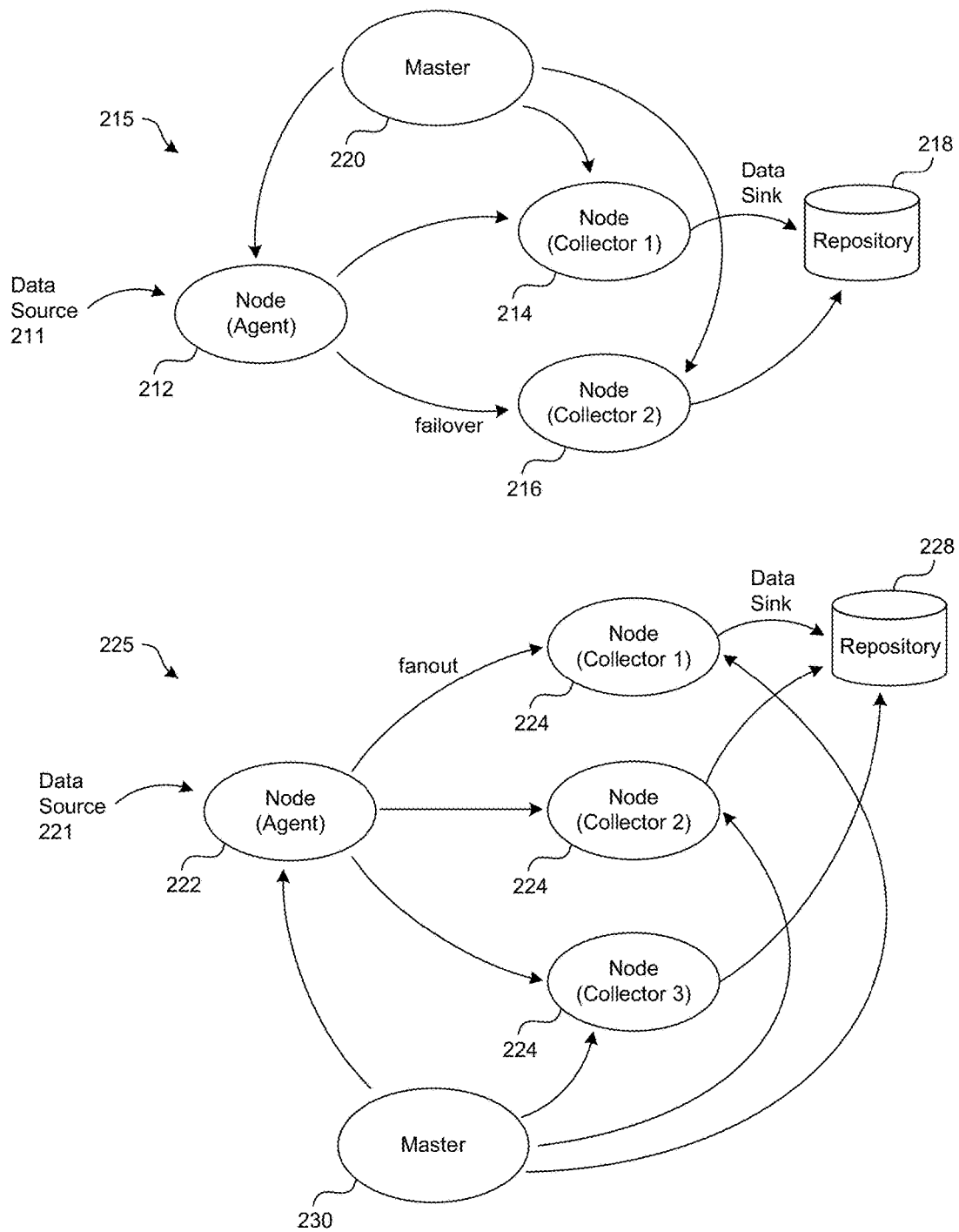
FIG. 2B depicts diagrams showing examples of configuration of nodes controlled/configured by a master and the dataflow therein from a data source to a data sink.

Note that node 202, although illustrated in the example of FIG. 2A as having being mapped to a single node 204, can be mapped to multiple nodes, as further illustrated in the example of FIG. 2B.

FIG. 2B depicts diagrams showing examples of configuration of nodes controlled/configured by a master and the dataflow therein from a data source to a data sink.

In the example flow 215, an agent node 212 can send incoming dataset/event from a data source 211 to multiple collector nodes (e.g., node 214 and node 216) which further maps the data flow to the repository 218. In one embodiment, the collector nodes are failover nodes for handling failures when appending new events. Failover sinks can be used to specify alternate collectors to contact in the event the assigned collector fails. Fail over sinks can also be used to specify a local disk sink to store data until the assigned collector recovers. For example, if node 214 goes down, the agent node 212 can deliver events via collector agent 216 to the repository 218 or any other receiving location or destination. In some instances, the collector 216 can queue their logs until node 214 comes back online. The failover assignment can be specified through the master 220. In addition, in one embodiment, the failover mechanism is built in by default by disbursing collector node assignments evenly among agent nodes. This can mitigate the chances of one collector from being overloaded when one collector fails.

Similarly, in the example flow 225, multiple collectors 224 are assigned to receive events/data flow from agent node 222. The collectors 224 can store the event/data flow in the repository 228. The collectors 224 may be failover chains. In addition, the collectors 224 can be fan out sinks, each of which receives the incoming event from the data source 221. The fan out sinks can be configured by the master 230 as collectors 224. The multiple collectors 224 as fan out sinks can be used for data replication for processing data off a main data flow path.

Figure 3A:
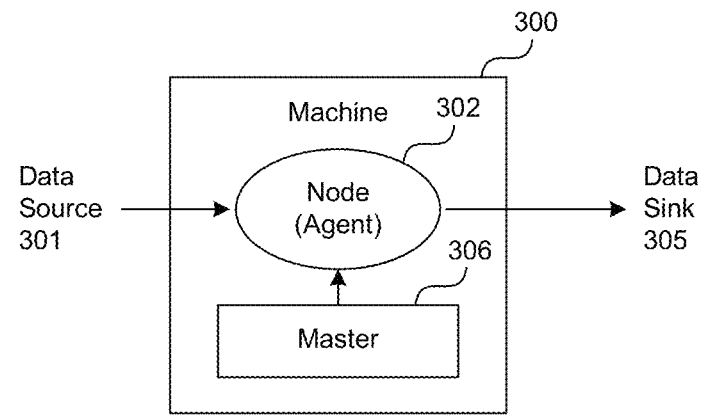
FIG. 3A depicts a diagram showing one example configuration of a node (nodes) controlled by a master residing on the same machine and dataflow therein from a data source to a data sink.
Figure 3A:
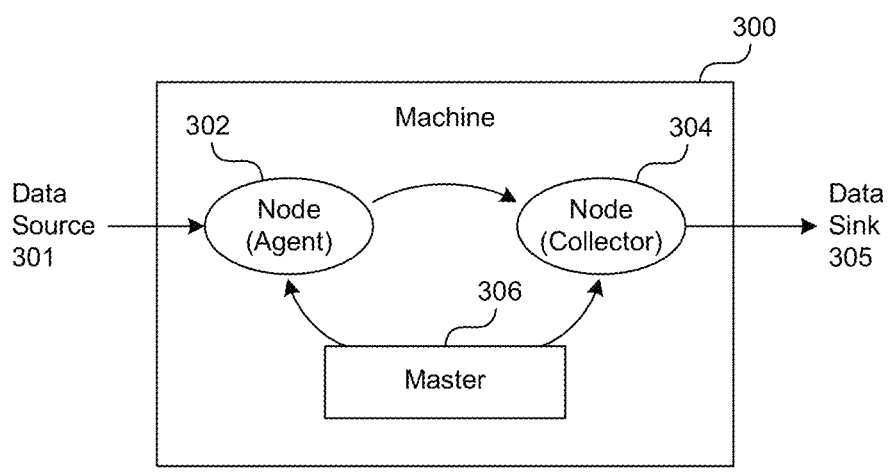

FIG. 3A depicts a diagram showing one example configuration of a node (nodes) controlled by a master 306 residing on the same machine 300 and dataflow therein from a data source 301 to a data sink 305.

The agent node 302 and the master 306 used for controlling, configuring, and/or monitoring the node 302 can be implemented on the same machine 300. The master 306 can be used to specify functions and/or properties of the agent node 302 in sending an incoming event/data set from the source 310 to the sink 305.

In one embodiment, a collector node 304 is also implemented on the same machine 304 as the agent node 302 and the master 306. The master 306 can control, configure, and/or monitor both nodes 302 and 304 in mapping events/data flow fro the source 301 to the sink 305.

Figure 3B:
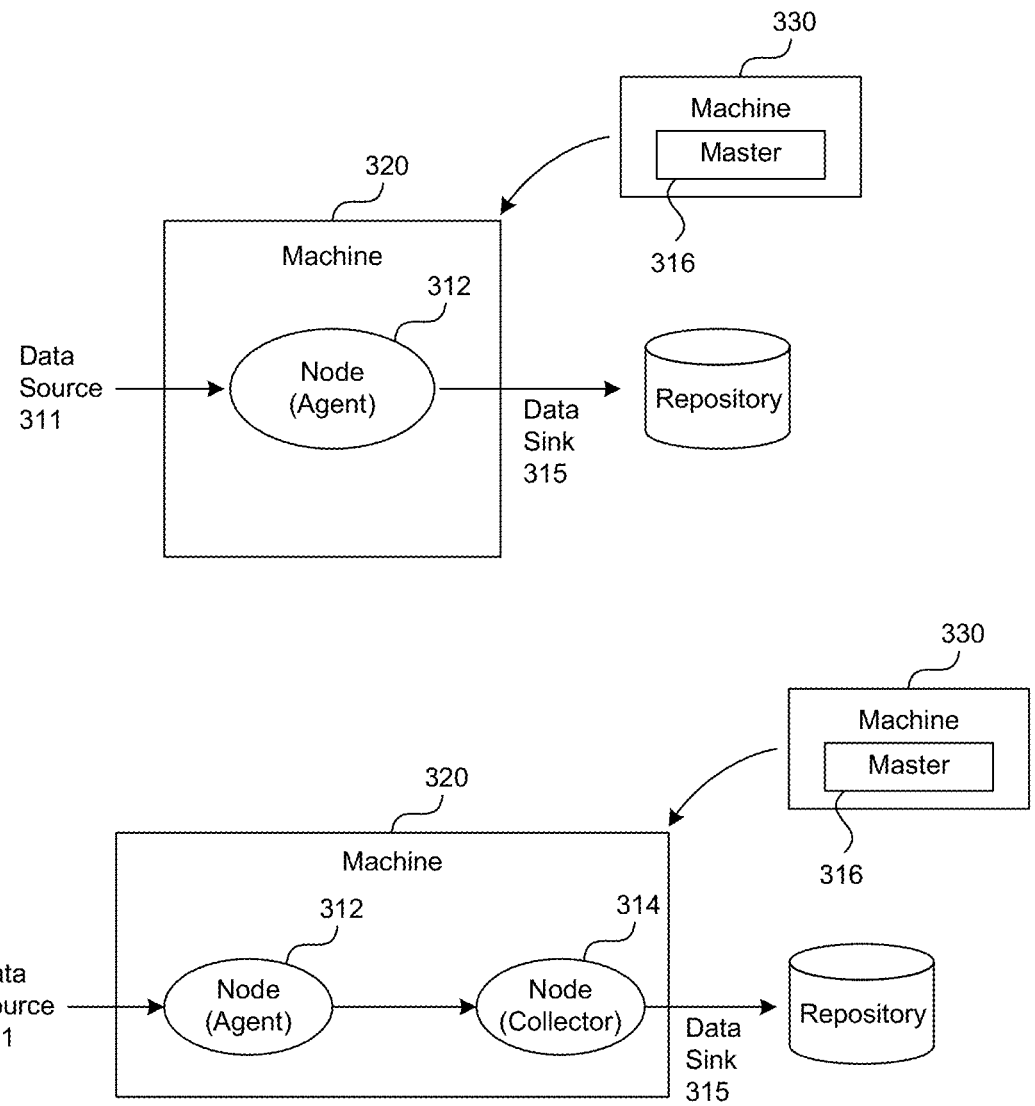
FIG. 3B depicts a diagram showing one example configuration of a node controlled by a master residing on a different machine and dataflow therein from a data source to a data sink.

FIG. 3B depicts a diagram showing example configurations of a node 312 or nodes 312 and 314 executed on a machine 320 and controlled by a master 316 which is executed on a different machine 330 and dataflow therein from a data source 311 to a data sink 315.

The master 316 executed on machine 330 controls, configures, and/or monitors the node 312 on the machine 320 in sending data sets/events from the data source 311 to the data sink 315. Alternatively, the collector node 314 which is mapped to receive datasets/events from the node 312 can also be executed on machine 320. The collector node can be configured to send datasets received from the node 312 to a data sink 315. The master 316 can also control, configure, and/or monitor the collector node 314.

However, having a single master is a single point of failure in the system. If the master 316 fails, the ability to update nodes (e.g., nodes 314 and/or 314), configure nodes, control, and/or monitor nodes, etc. goes down. Thus, in one embodiment, multiple masters can be implemented on multiple machines to maintain a consistent state in the system. In addition, using multiple masters on multiple machines allows the system to scale with increasing amount of log data and events to process and analyze.

Moreover, using multiple collectors can also increase log collection throughput and can improve timeliness of event/dataset delivery since more collector nodes are available at any given time during operation. Since data collection is parallelizable, the load from agent nodes can be shared and distributed among many collector nodes. Example architectures with multiple masters and multiple collectors are illustrated in FIG. 4-5.

Figure 4:
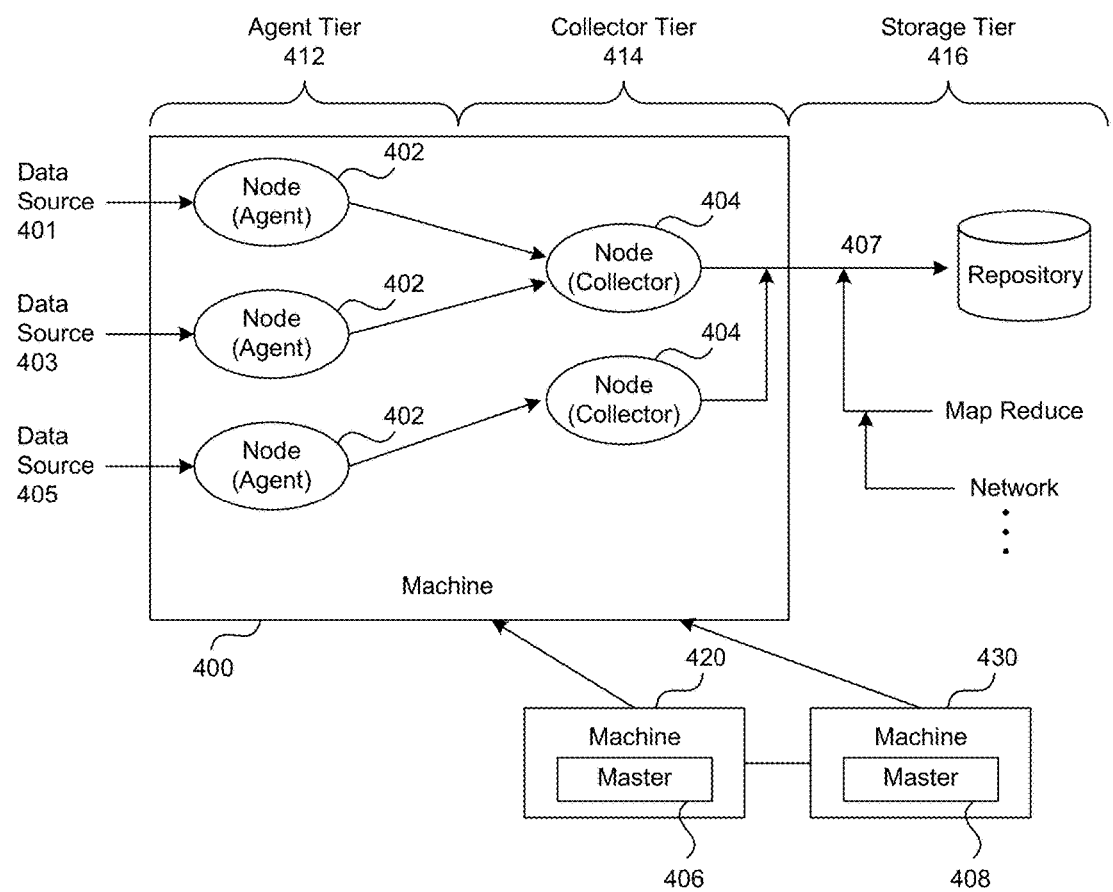
FIG. 4 depicts a diagram showing an example configuration of nodes in multiple tiers on the same machine controlled by multiple masters residing on different machines and dataflow therein from data sources to a data sink.
Figure 5:
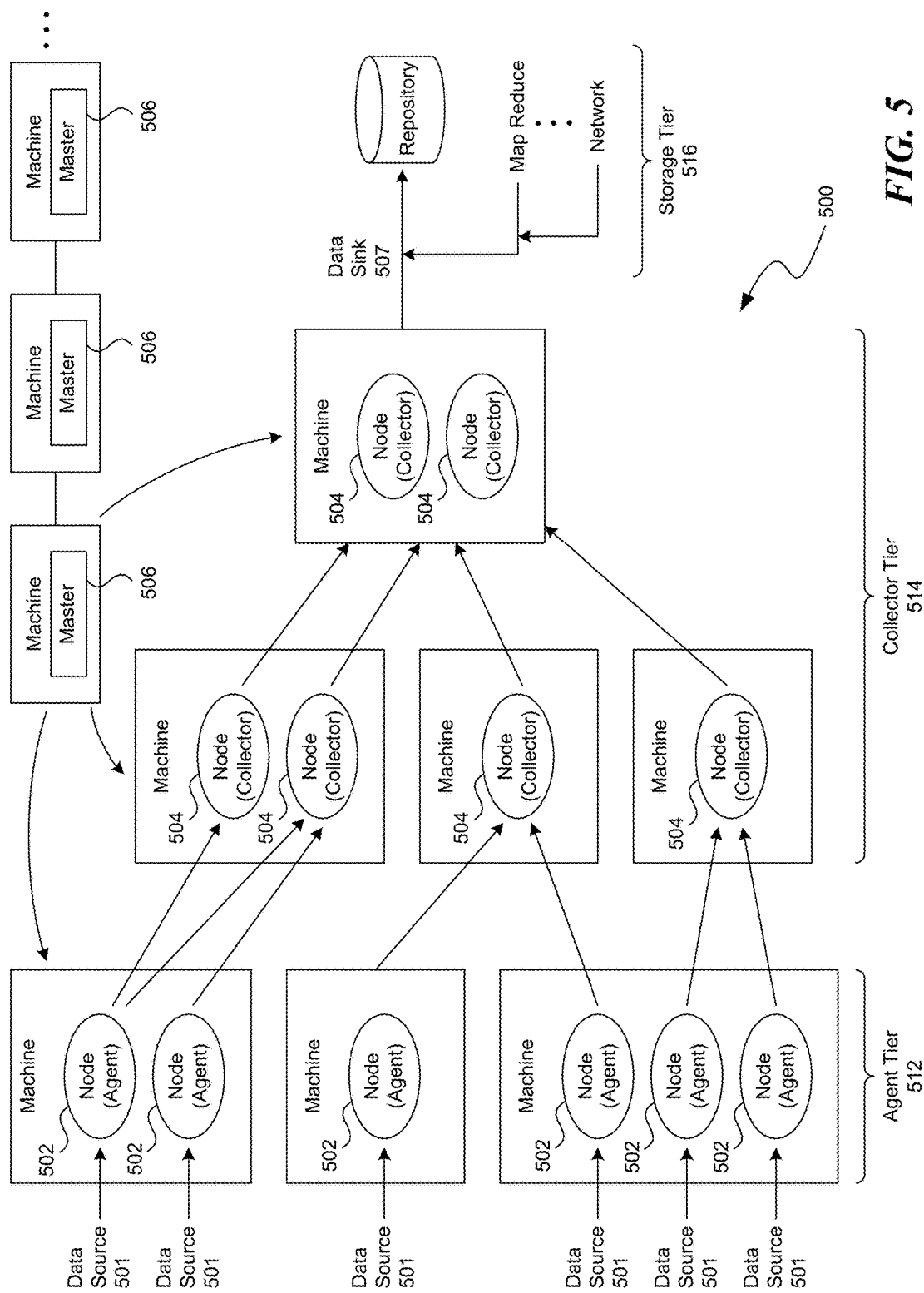
FIG. 5 depicts a diagram showing an example configuration of nodes in multiple tiers on different machines controlled by multiple masters residing on different machines and dataflow therein from data sources to a data sink.

FIG. 4 depicts a block diagram showing an example configuration of nodes in multiple tiers on the same machine 400 which controlled by multiple masters 406 and 408 residing on different machines 420 and 430 respectively, and dataflow therein from data sources 401, 403, and 405 to a data sink 407.

The example system of FIG. 4 utilizes multiple agent nodes 402 in an agent tier 412 and multiple collector nodes 404 in a collector tier 414. In one embodiment, the nodes 402 in the agent tier 412 are located on the machine 400 which is also producing logs that are being collected. For example, the data source 401 of the node 402 can be configured to be a port on the machine 400. The sink of the node 402 can be configured to be node 404 in the collector tier 414.

In one embodiment, collector nodes 404 can listen and receive data from multiple agent nodes 412 and aggregate logs. In addition, collector nodes 414 can further write the logs to a data sink 407 in the storage tier 416. In reliable mode agent nodes generally write data to the respective local disks. This data might not be deleted until after it knows that the data has reached its final destination. Collectors generally don't write to their local disk—they actually forward data to the storage tier which eventually points the collector to storage tier nodes that write to storage tier disks. An agent is generally on a system that is responsible for doing other work (serving web pages) and thus agent nodes typically strive to have low resource utilization (e.g., cpu, memory, disk). Collector nodes are generally dedicated to processing large amounts of data and can use more expensive algorithms because its processing units are generally less occupied with other tasks. Note that the data sink 407 may or may not be a storage unit/device. For example, the collector nodes 404 can also send the data sets downstream to cluster for further processing, a network, etc.

FIG. 5 depicts a diagram showing an example configuration of nodes 502 and 504 in multiple tiers on different machines controlled by multiple masters 506 residing on different machines and dataflow therein from data sources 501 to a data sink 507.

Agent nodes 502 can be executed on different machines and map incoming data/events to collector nodes 504. The multiple machines may be in a cluster and can include web servers. In general, the multiple machines generate the log data to be collected and each of the multiple machines is associated with at least one agent node to facilitate data collection and/or aggregation. In one embodiment, the agent nodes 502 can forward the collected log data or events to a collector tier 512 which includes at least one collector node 504 but in some instances, multiple collector nodes 504 which can combine streams of log data/events into larger streams, for example, for writing to the storage tier 516. The collector node(s) 504 can aggregate the log data collected from the machines on which the agent nodes are executed. The collector nodes 504 can also be executed on different machines with each machine having various numbers of collector nodes 504, which passes events on to the data sink 507.

In one embodiment, the collector node(s) 504 outputs the log data to multiple destinations in the same or different formats. Some of the supported formats include, by way of example not limitation, raw text file, json (a web format), avro binary (an apache serialization format), a hadoop native sequence file, text emulating a syslog formatted entry, an apache web server formatted entry, and a "log4j" formatting pattern, etc. File formats are the format for batches of records. Record formats are the formatting for individual events/records. A collector writing to storage tier can be responsible for file formats. The work for formatting individual records however can be pushed upstream. As an example, let's say the agent gets an event that has raw data An agent node can extract features and/or reformat the data found in the event/record and write this intermediate result to the metadata table. The downstream collector node can use the preformatted data and write each formatted record in the file format. One embodiment of the topology includes a storage tier 516 having a storage system coupled to the machines in the system. The storage system can include a distributed file system to which the collector node(s) 504 in the collector tier 514 stores the log data aggregated from the set of machines in the system.

Note that analytics can be performed on the log data/aggregated events by the agent nodes 502 and/or the collector nodes 504. The master 506 can be used to control/configure the types of analytics that are performed.

Agent nodes 502 and collector nodes 504 can be configured, re-configured via the masters 506, which can be executed on multiple machines that are different from the machines that the collector 504 and agent nodes 502 are executed on. In one embodiment, the masters 506 specify the configuration/topology of the system 500 and the agent node(s) 502 and the collector node(s) 504 contact the master 506 to retrieve configuration information. For example, the master 506 can specify that an agent data sink for the agent node 502 is a collector data source for the collector node 504 in the collector tier 514 and that a collector data sink 507 for the collector node 504 is the distributed file system in the storage tier 516. In addition, the master 506 can be used by a user to configure or reconfigure the agent data sink and agent data source and/or to configure or reconfigure the collector data source and the collector data sink.

FIG. 6 depicts a block diagram illustrating example components of a node 602 through which dataflow occur.

The node 602 can include a source specifier module 604, a sink specifier module 606, a configuration file 610, and/or a decorator module 620.

As used in this paper, a "module" or an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

One embodiment of the node includes a source specifier module 604 and a sink specifier module 606. The source specifier module 604 and sink specifier module 606 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The source specifier module 604 can include an identifier or mapper to a source that produces or accepts events or data fed into the system. The node 604 reads or tails the event source. For example, the module 604 can detect, recognize, identify, and/or store a port ID (e.g., a port name, a TCP or UDP port, port number) and a file ID (e.g., a file name, a file path, etc.). The file can be any type of file, including but not limited to, messages, system log files, Hadoop log files, text files, etc. In addition, the event source can include, a console, a sequence file (e.g., serialized events in a sequence file format), a source that synthetically generates a specified number of messages of a select size.

The sink specifier module 606 includes an identifier or mapper to a location that consumes data or an event (e.g., a receiving or destination location for data or events). A sink can include, by way of example, a disk, a repository, a distributed file system on a disk (e.g., the Hadoop distributed file system), a console, a device/machine, and/or a network/network connection over which the data/event is to be forwarded over. Thus, the sink specifier module 606 can detect, recognize, identify, and or store, a machine/device ID, a port ID, a file ID, and/or a path ID. In one embodiment, the path ID is a distributed sequence file path.

The source and sink specifier modules can store or retrieve the configuration information stored in the configuration file 610. The configuration file 610 may be loaded with default values upon installation. In addition, the configuration file 610 may be updated by a master that controls the node 602. The updates the configuration file 610 may occur while the system is running or when the system is off.

Note that the node 602 may be assigned to have an agent role or a collector rule. In general, an agent node is co-located on machines/devices with the service/application that is generating, producing, creating events/logs/data. A collector node can receive, accept, check, listen for data from one or more agent nodes. A collector node can be mapped to the data sink of an agent node, for example, to aggregate logs/data and/or to extract analytics. A collector node can further write the dataset, events, and/or any generated events to storage (e.g., a distributed file system).

One embodiment of the node 602 includes a decorator module 620. The decorator module 620 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality. The decorator module 620 can add properties/functionalities of a sink and modify the data/event streams that pass through them, like a wrapper. For example, the decorator module 620 can be used to increase reliability, robustness of the system or to perform analytics. An example of the decorator module is illustrated in detail with further reference to the example of FIG. 7. A decorator can correspond to a sink that interposes between the source and the sink. The decorator processes events and then sends it down the pipeline to another sink (which may be another decorator wrapping another sink) on the same node/dataflow. Sources produce events, and pass them through the decorator to sink.

FIG. 7 depicts a block diagram illustrating example components of a decorator module 720 in a node.

The decorator module 720 can include, a write ahead module 702, a sampler module 704, an open module 706, an append module 708, a batch/unbatch module 710, and/or a GZIP/GUNZIP module 712.

As used in this paper, a "module" or an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

One embodiment of the decorator module 720 includes a write ahead module 702. The decorator module 620 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The write ahead module 702 provides reliability and durability and writes/stores events/datasets to persistent storage on the machine generating the event (write Ahead( . . . )) prior to forwarding them. In the event and any of the downstream nodes fails, the system has a copy of the dataset that can still be retrieved. In response to determining that the dataset/event has safely reached its destination, the copy can be deleted from persistent storage. The write ahead module 702 can also assign batch identifiers for batches of messages/events to track One embodiment of the decorator module 720 includes a sampler module 704. The decorator module 704 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The sampler module 704 can sample data input or events at select intervals (e.g., intervalSampler(N)). For example, the sample module 704 can be configured to send every nth element/event from the source to the data sink. In one embodiment, the sampler module 704 samples based on a probability such that each event or message has a specified chance of being forwarded (e.g., probSampler (p)). In addition, the sampler module 704 can be a reservoir sampler (e.g., reserverSampler (K) such that when flushed, a selected number (K) of elements are forwarded and each event that passes through has the same probability of being selected for forwarding.

One embodiment of the decorator module 720 includes an open module 706 (or re-try open module). The open module 706 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality. In one embodiment, the open module 706, in reading or opening a file or incoming event, continues to re-try the opening process if the initial attempt fails.

One embodiment of the decorator module 720 includes an append module 708 (or re-try append module). The append module 708 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality. In one embodiment, the append module 708, can append events to a target. In the event that the append fails, the module 708 can close the target, re-open it and attempt to append again. In general, sinks and decorator modules include open, append, and close functions. Typically, if one of these operations fail, the modules can give up after a first try. Using the open module (or re-try open module) or the append module (e.g., re-try append module), the sink/decorator can be configured to keep trying the failed operation (e.g., retry opening or appending).

One embodiment of the decorator module 720 includes a batch/unbatch module 710. The batch/unbatch module 710 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The batch/unbatch module 710 can buffer a select number of events/message together to be forwarded or sent as a single aggregate event. The batch/unbatch module 710 can take an aggregate event and split and forward the original events.

One embodiment of the decorator module 720 includes a GZIP/GUNZIP module 712. The GZIP/GUNZIP module 712 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality. The GZIP/ZIP module 712 can zip or unzip an event/message or multiple events/messages.

In general, multiple decorators can be assigned to an event, message, or dataset. For example, decorators can be combined to batch multiple messages together and compress the messages before forwarding them to the mapped data sink.

Figure 8:
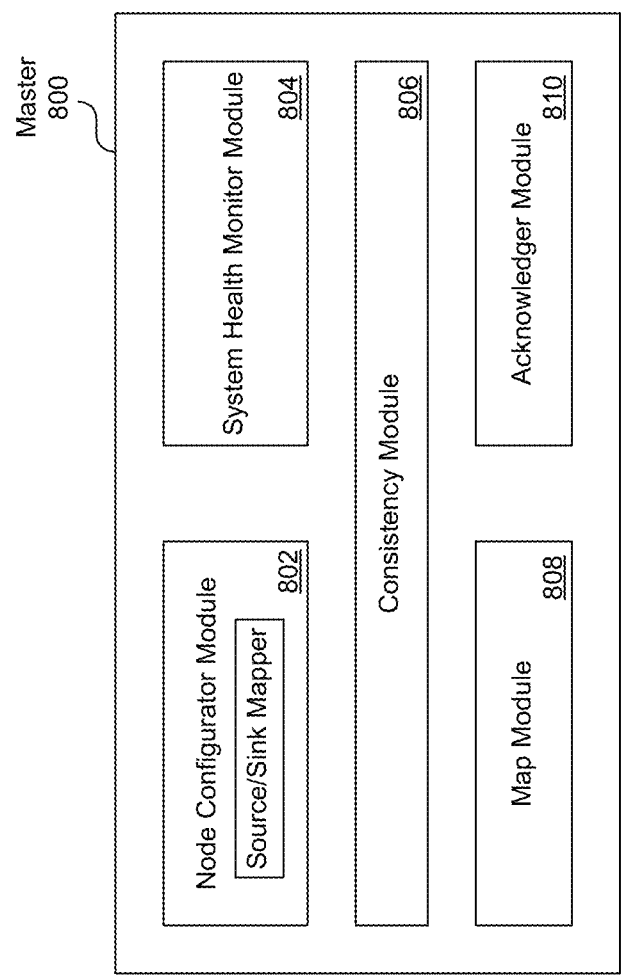
FIG. 8 depicts a block diagram illustrating example components of a master that controls the nodes in the system.

FIG. 8 depicts a block diagram illustrating example components of a master 800 that controls the nodes in the system.

The master 800 can include a node configurator module 802, a system health monitor 804, a consistency manager 806, a map module 808, and/or an acknowledger module 810. The master 800 can include additional or less modules. The master 800, although illustrated as being a discrete component, can be implemented on multiple machines, as shown in the examples of FIG. 4-5 on full or partial redundancy.

The master 800, as implemented on a single or multiple machines can perform as a central control and monitor for the system. The master 800 can track and monitor the status, health of nodes, and the data flow in the system. In tracking and monitoring system status, the master 800 can automatically perform any system re-configurations that may be needed to resolve node failure or load imbalance, for example.

The master 800 can identify, detect, or be used to specify new nodes or deleted nodes in the system and perform any adjustments in data flow by updating the mapping of data sinks and sources. In general, the nodes contact the master 800 to retrieve configuration information. When a node contacts the master, the node detects that the configuration version has been changed and can instantiate and activate the configuration. This allows updates to the system and mapping to be performed in dynamically, in operation, without starting or rebooting the system. For example, a node's configuration can be updated during operation.

Additionally, a user can reconfigure the setting by accessing the master 800. One of accessing the master 800 is through the master's web page. Examples of screenshots are illustrated in FIG. 10A-F. The configuration link is displayed on the master's web interface. In the interface, for example, node names are depicted and sources and sinks can be viewed, updated, or deleted. Once a configuration has been changed, the version identifier or stamp on the master's web page will be updated.

As used in this paper, a "module" or an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

One embodiment of the master includes a node configurator module 802. The node configurator module 802 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

In one embodiment, the node configurator module 802 detects, updates, identifies, stores configuration settings of the nodes in the system. For example, the source and sink mappers can configure the data source(s) and/or data sink(s) for each node. In addition, the module 802 can assign and/or track functions/properties (e.g., analytics functions) that a node can perform.

One embodiment of the master includes a system health monitor 804. The system health monitor 804 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The system health monitor 804 can track, detect, determine, monitor, system traffic, node health/status, dataflow, load balance/imbalance in the system. The master 800 can update/adjust data flow based on system traffic and any load imbalances. In addition, if certain nodes have failed, the master 800 can assign failover nodes such that data flow is not interrupted.

One embodiment of the master includes a consistency module 806. The consistency module 806 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification and/or carrying out equivalent functionality.

The consistency module 806 maintains consistency among multiple masters implemented on multiple machines in a system, by leveraging the consensus protocol and/or a gossip protocol. For example, the master 800 can maintain consistency using a consensus protocol for order critical state changes and using a gossip protocol for weak consistency among data including but not limited to node status updates, reporting information, and metrics information.

One embodiment of the master includes a map module 808 and an acknowledger module 810. The map module 808 and the acknowledger module 810 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The map module 808 monitors and manages a set of tags associated with batches of messages to track which messages or batches or messages have been successfully sent to a receiving location or stored in a data repository.

In one embodiment, an agent node generates a batch comprising multiple messages from the log data and assigns a tag (e.g., can include a begin event tag and an end event tag) to the batch. The agent can also compute a checksum for the batch of multiple messages and stores he tag and the checksum to a write-ahead-log (WAL) in persistent storage of the machine from which the dataset was generated.

The agent node sends the batch of messages to a collector which verifies the checksum of the batch, and if successful, adds the tag to a map of tags for batches of messages. When the collector node determines that a batch of messages has successfully reached a receiving location or stored in storage/file system, the collector agent publishes the tag to the map module 808 of the master. Thus, the map module 808 includes identifiers for events, messages, or batches of messages that have reached their mapped locations. The master 800 can use the identifiers in the map module 808 to notify the agent nodes of batches that have been successfully stored or sent. In one embodiment, the acknowledger module 810, using the tags that are associated with batches in the map, acknowledges the agent node and the collector node of the batches that have been safely stored in the file system or sent down stream.

Figure 9:
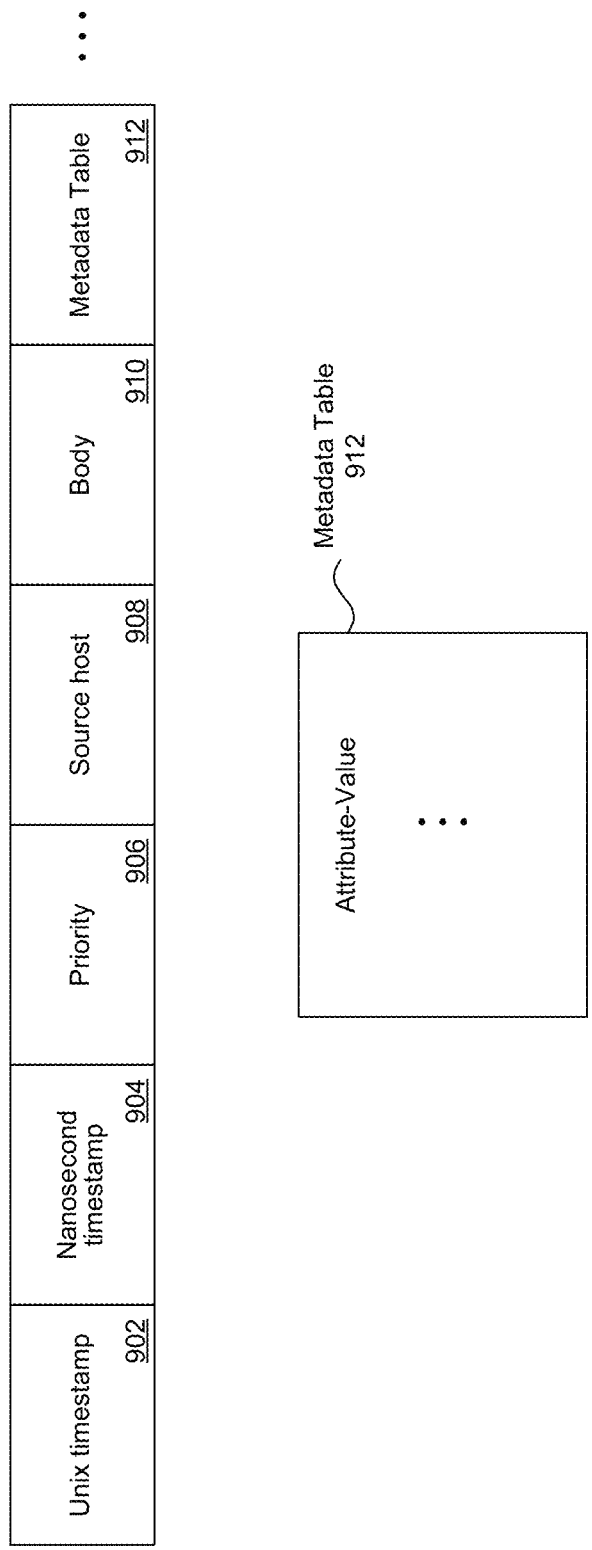
FIG. 9 depicts an example of an extensible data model used to represent events or data flow in a distributed system from a source to a sink.

FIG. 9 depicts an example of an extensible data model used to represent events or data flow in a distributed system from a source to a sink.

The data model, for example, can include one or more timestamp fields 902 and 904, a priority field 906, a source host field 908, a body field 910, and/or a metadata table field 912. The data model is extensible and thus additional fields can be added on the fly during data flow. The data model is described with further reference to the example of FIG. 15.

Figure 10A:
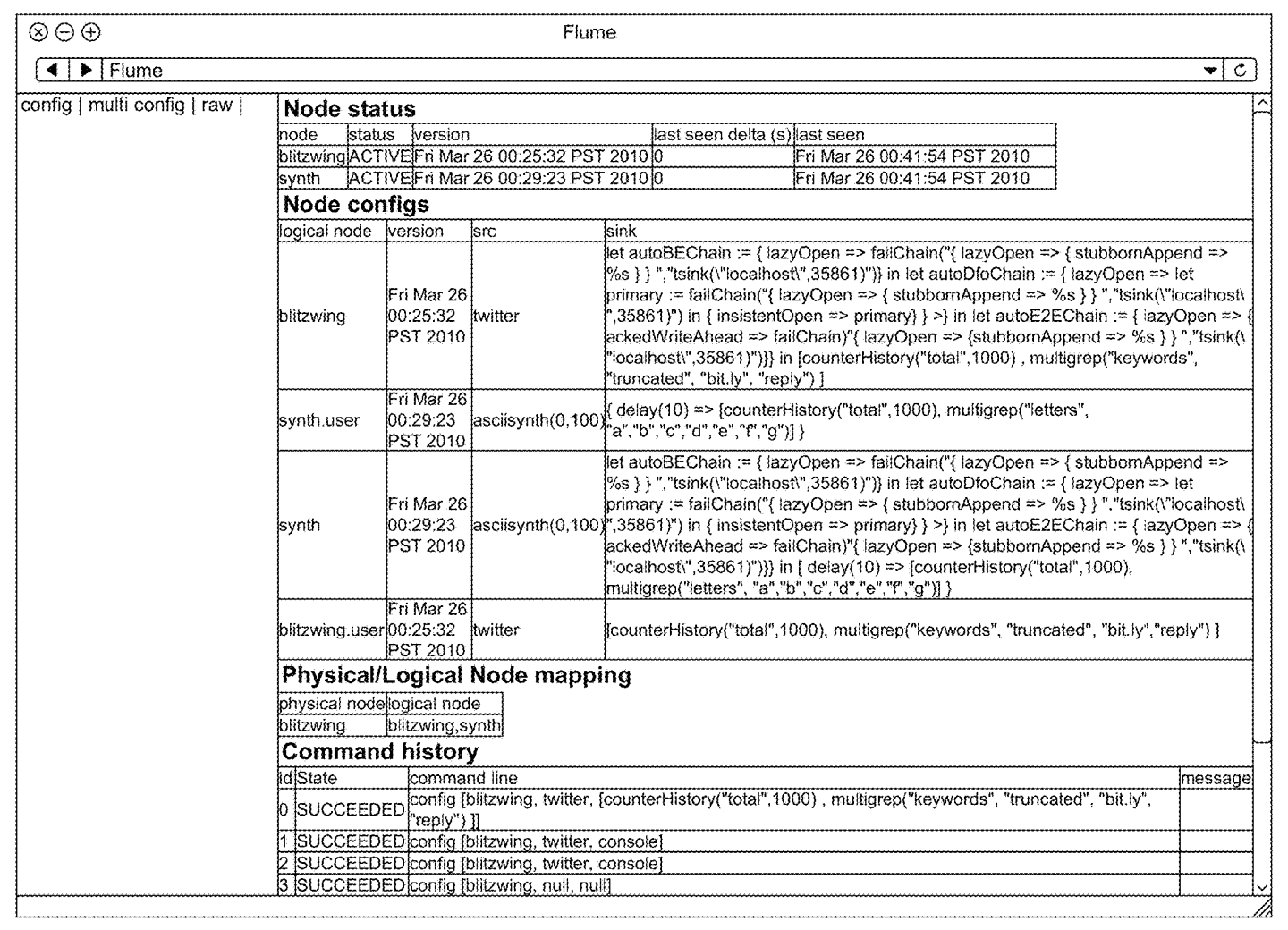

FIG. 10A depicts a screenshot of an example user interface showing node status and configurations with node mappings. This user interface can be accessed from the master, FIG. 10B depicts a screenshot of an example user interface for configuring a node. The configuration page can be accessed from the master's web page. For example, a node to be configured can be selected from the list and its source/sink can be specified.

Figure 10C:
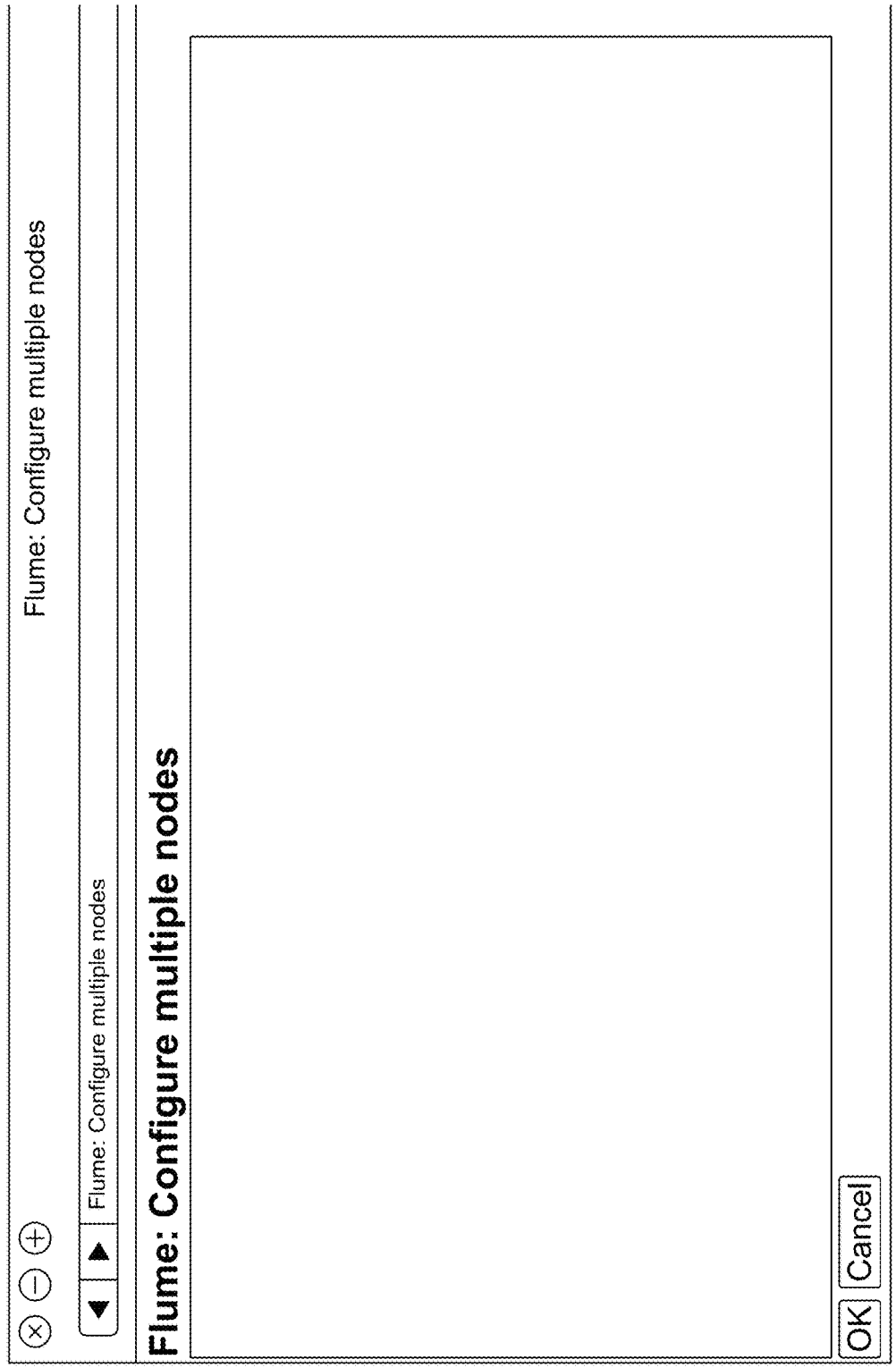
FIG. 10C depicts a screenshot of an example user interface for configuring multiple nodes.
Figure 10D:
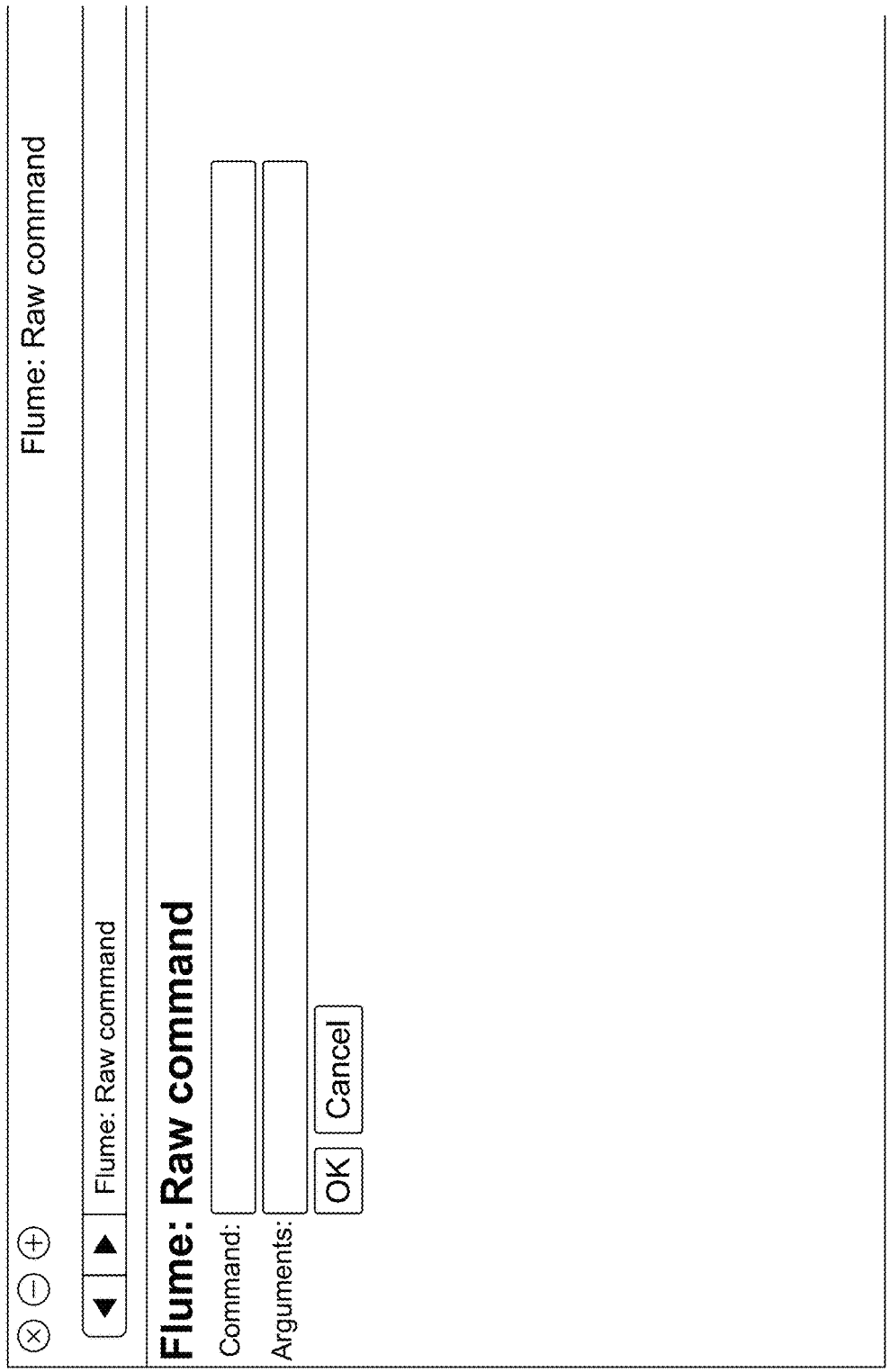
FIG. 10D depicts a screenshot of an example user interface for issuing raw commands.
Figure 10E:
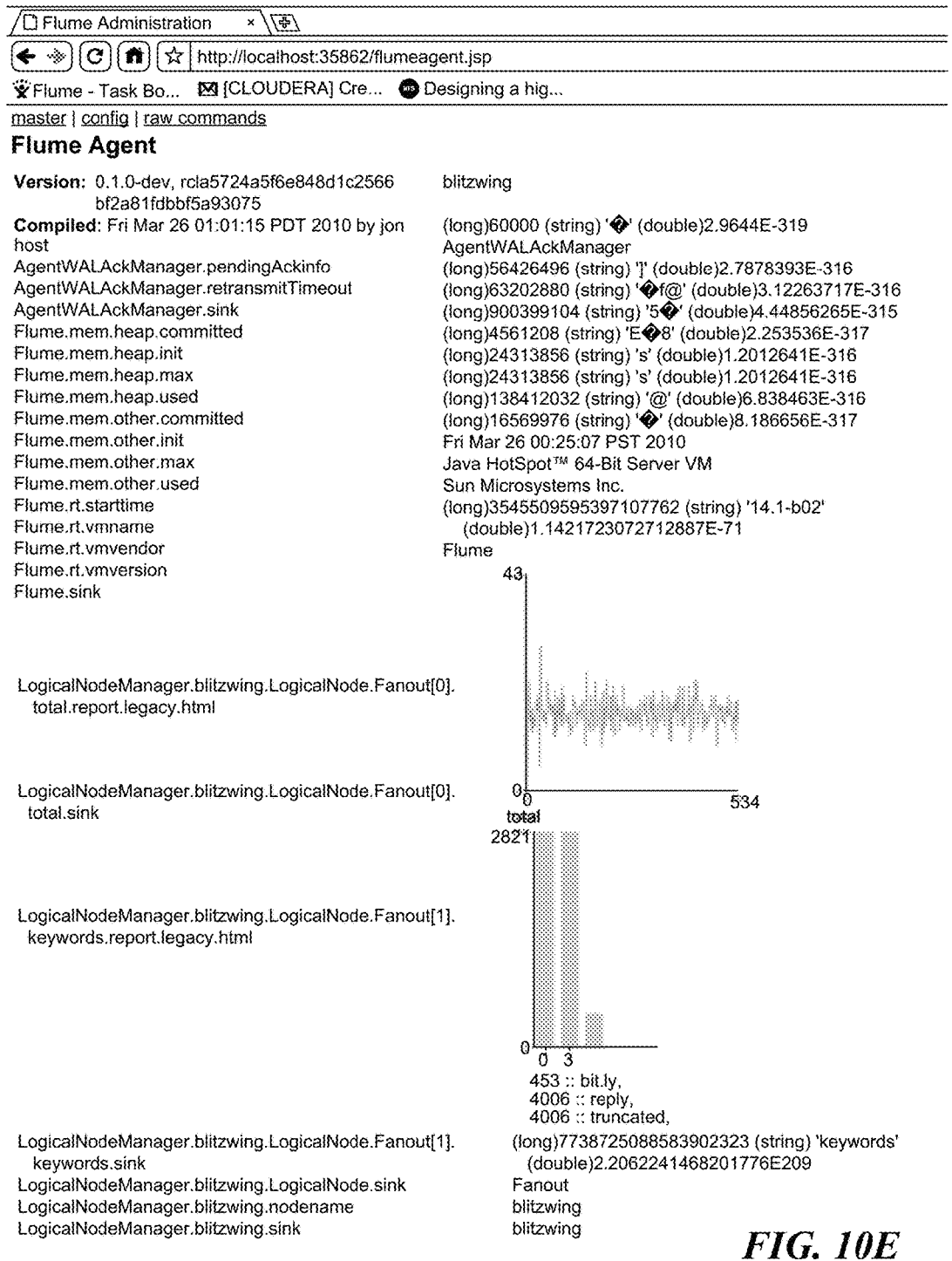
FIG. 10E depicts a screenshot of an example user interface showing statistics for a node.

FIG. 10C depicts a screenshot of an example user interface for configuring multiple nodes. FIG. 10D depicts a screenshot of an example user interface for issuing raw commands. Commands can be used to modify the global state of the system. For example, the "config" command sets the configuration of a flow on the master, who in turn sends the info to a node. The "refresh" command takes an existing config and forces the node to reset (close then open). The "decommission" command removes a logical node. The "unmap" command removes a logical node from a physical node. The "spawn" command creates a new logical node (could be used to associate an unmapped logical node onto another physical machine). Confirmation that command was received by the master by reviewing the command history section of FIG. 10A. Confirmation that a node has installed the changes the command may have caused by looking at the web page in the examples of FIGS. 10E and 10F. FIG. 10E depicts a screenshot of an example user interface showing statistics for a node. The user interface shows the data flow configuration settings, and memory usage of a particular node. For example, this figure shows information about the node "LogicalNode[0]" and includes two analytics reports: a graph showing the number of incoming events and a graph showing a histogram of the frequency of certain words in the stream. The source in this example is Twitter, and the sinks for the node include the graphs. FIG. 10F depicts a screenshot of an example user interface showing statistics for a node. This figure illustrates the configuration info for this data flow, and similarly has an event graph and a histogram (showing an even distribution of substrings).

Figure 11:
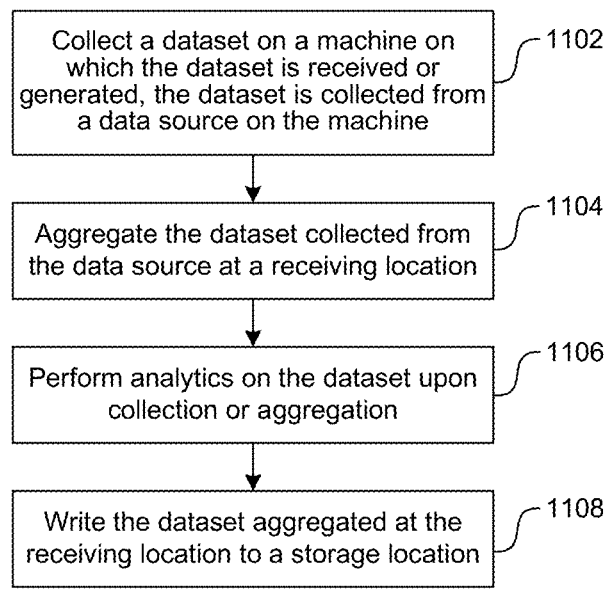
FIG. 11 depicts a flowchart of an example process of facilitating collecting and aggregating datasets that are machine or user-generated for analysis.

FIG. 11 depicts a flowchart of an example process of facilitating collecting and aggregating datasets that are machine or user-generated for analysis.

In process 1102, a dataset is collected on a machine on which the dataset is received or generated. The data set can include logs from an application that is local or remote, a service, a social networking site, feeds, status updates, etc. The dataset can be collected from a data source on the machine. In addition, datasets can be collected from machines in a cluster which can include web servers, for example. In process 1104, the dataset that is collected from the data source is aggregated at a receiving location. The receiving location can be, for example, a network, a network connection, a physical disk, a consul, a text file, a file in a sequence file format, an HDFS path, a port, a monitoring or alerting application, and/or an IRC. One or more receiving location can be specified.

In one embodiment, the mapping of the data source to the receiving location is controlled by a master. The master can be executed on a different machine than the machine on which the dataset is generated or received. The master can also be executed on the same machine as the one on which the dataset is received or generated. In one embodiment, the data source is mapped to a receiving location via a logical node. The logical node can contact the master to obtain configuration information including but not limited to, functions, data source, data sink, etc. In process 1106, analytics are performed on the dataset upon collection or aggregation. Analytics that can be performed include, by way of example, feature extraction, filtering, and transformation, generation of aggregate counts, and/or generation of statistics. The analytics can be performed in near real time relative to collection of the dataset. In process 1108, the dataset aggregated at the receiving location is written to a storage location. With 10 there is typically a tradeoff between throughput and latency. Usually, sending lots of small things will take a lot longer than a few large things, even if the actual amount of payload is the same. This is generally due to overhead associated with each sent value (sent events in Flume's case). In one embodiment, delay (latency) can be added to help the scheduler improve on throughput.

Figure 12:
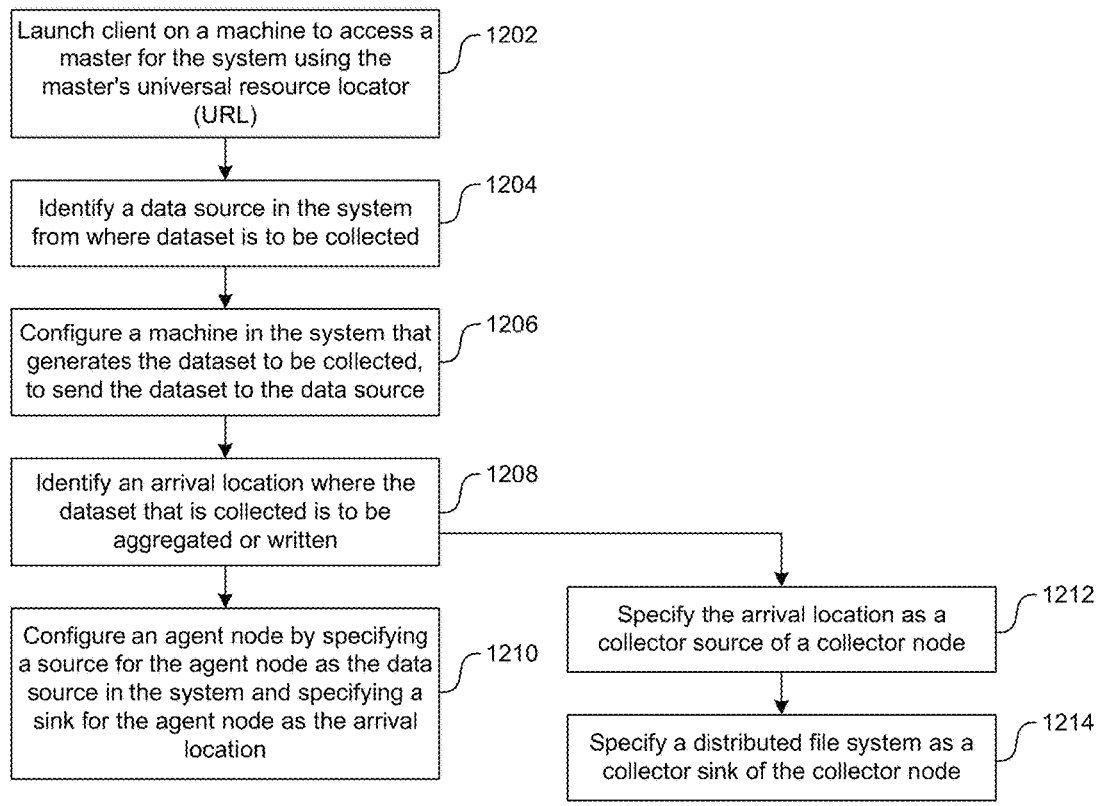
FIG. 12 depicts a flowchart of an example process for configuring a system to collect and aggregate datasets.

The storage location can be distributed among multiple machines and the dataset is stored redundantly on a distributed file system FIG. 12 depicts a flowchart of an example process for configuring a system to collect and aggregate datasets.

In process 1202, a client (e.g., a web page/interface or a command line interface, another program (a master), or a device (e.g., a laptop, a cell phone, a smartphone, iPhone, etc.) is launched on a machine to access a master for the system, for example, using the master's universal resource locator (URL). The master's web page can be used to view, change, and/or update a node's configuration, as illustrated in the example of FIG. 10A. The system may include multiple machines (e.g., in a cluster) which generate datasets that are to be collected. In process 1204, a data source in the system from where dataset is to be collected is identified.

In process 1206, a machine in the system that generates the dataset to be collected is configured to send the dataset to the data source. In process 1208, an arrival location where the dataset that is collected is to be aggregated or written is identified. In process 1210, an agent node is configured by specifying a source for the agent node as the data source in the system and specifying a sink for the agent node as the arrival location. In addition, the agent node is generally configurable to perform analytics on the dataset.

In process 1212, the arrival location is specified as a collector source of a collector node. In process 1214, a distributed file system is specified as a collector sink of the collector node. The distributed file system can be, for example, the Hadoop distributed file system (HDFS).

Figure 13:
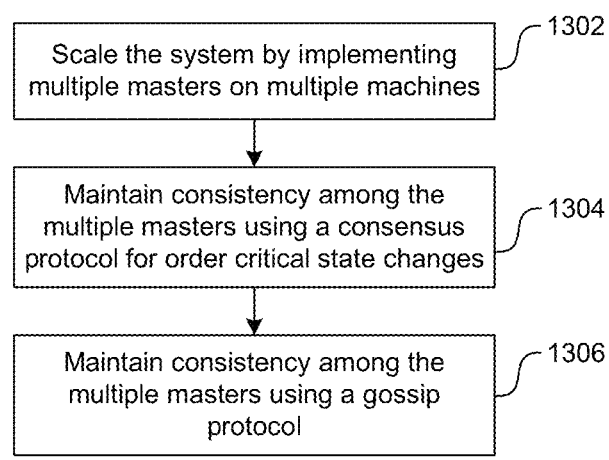
FIG. 13 depicts a flowchart of an example for scaling the system by implementing multiple masters on multiple machines.

FIG. 13 depicts a flowchart of an example for scaling the system by implementing multiple masters on multiple machines.

A master provides a centralized management point to monitor and update data flows. Changes in the system are told to the master, and changes can come from the master. When new resources are added to the system, the information is updated at the master. In addition, if a user issues a command that changes global state, the master can be used such that the master can react to these state changes. In addition, the master can dynamically respond to system changes such as load imbalances, node failure, machine failure, new hardware, etc. For example, a user configures a new node to be a collector. The master detects this, and automatically reacts by changing the configuration of some nodes to send events downstream to the new collector. The master can do this by changing global state. In another example, if a collector node hasn't communicated with the master for a while. The master may decide that the machine might have failed and automatically reacts by sending an event to an admin (via email/irc/im/sms, etc.). Similarly, in yet another example, nodes periodically report their performance metrics to the master (e.g., in the examples of FIGS. 10E, 10F). The reports indicate that a collector is being overloaded with work, and reacts to new metrics data by shifting some of the work from the overloaded collector to another with less load. This can be performed by changing global state.

Nodes in the system can be configured/reconfigured dynamically via the master. The nodes can be arranged in a three-tier topology (e.g., agent tier, collector tier, storage tier) or any other types of topology with any number of tiers. A user can use the master to configure the topology and the nodes, for example, by accessing a link on the web page for the master, as illustrate in the example screenshot of FIG. 10B.

Since the master provides centralized management, having only one master is a single point of failure in the system. Thus, in one embodiment, in process 1302, the system is scaled by implementing multiple masters on multiple machines.

In process 1304, consistency is maintained among the multiple masters using a consensus protocol for order critical state changes. For example, order critical state changes can include data flow configurations and node-to-machine mappings. In process 1306, consistency is maintained among the multiple masters using a gossip protocol. For example, node status updates, reporting information, and metrics information are maintained using the gossip protocol. Typically, stronger consistency is maintained using the consensus protocol and weaker consistency is maintained using the gossip protocol.

Figure 14:
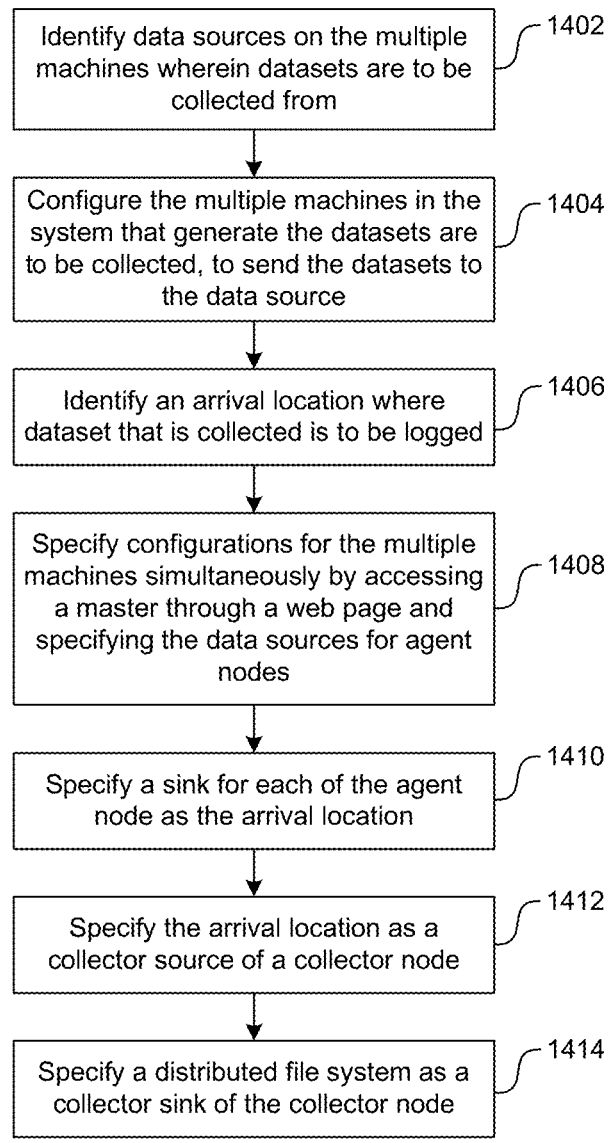
FIG. 14 depicts a flowchart of another example process for configuring a system to collect and aggregate datasets and to perform analytics on the datasets.

FIG. 14 depicts a flowchart of another example process for configuring a system to collect and aggregate datasets and to perform analytics on the datasets.

In process 1402, data sources on the multiple machines wherein datasets are to be collected from are identified. In process 1404, the multiple machines in the system that generate the datasets to be collected are configured to send the datasets to the data source. In process 1406, an arrival location where dataset that is collected is to be logged is identified.

In process 1408, configurations for the multiple machines are specified simultaneously by accessing a master through a web page and specifying the data sources for agent nodes. The master can be used to configure and/or dynamically reconfigure the agent nodes. In addition, statuses of the agent nodes are visible via the master.

In process 1410, a sink is specified for each of the agent node as the arrival location. In one embodiment, the sink is configured to be a fan-out sink that sends incoming datasets to child sinks coupled to the sink for data replication or for splitting off a CPU intensive tap. In addition, the sink can be configured as a failover sink that specifies alternate collectors in case the collector fails. For example, the failover sink can specify a local disk to store data until the sink that has failed recovers.

In process 1412, the arrival location is specified as a collector source of a collector node. In process 1414, a distributed file system is specified as a collector sink of the collector node.

Figure 15:
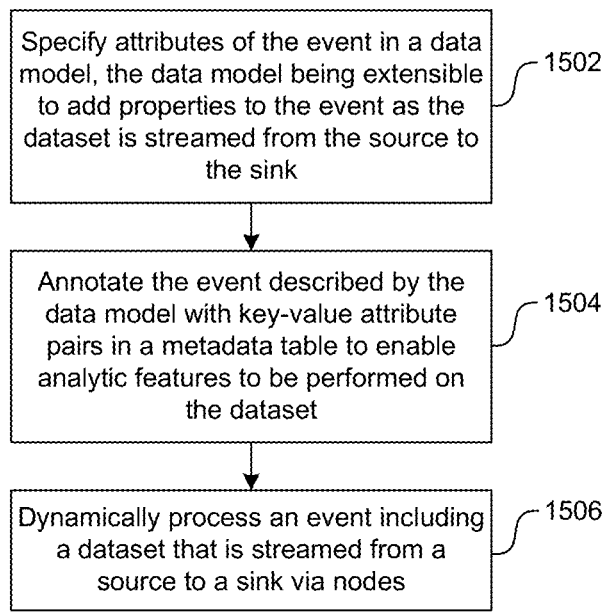
FIG. 15 depicts a flowchart of an example process for dynamically processing an event including a dataset that is streamed from a source to a sink via nodes.

FIG. 15 depicts a flowchart of an example process for dynamically processing an event including a dataset that is streamed from a source to a sink via nodes.

Events or messages are transmitted in a flexible and extensible data model. For example, events can be formatted as unstructured blobs and can be annotated with key-value attribute pairs which can be arbitrary. This allows analytic features include feature extraction, filtering, and transformation to be performed as the system forwards datasets downstream. The general pattern can utilize use a feature extractor to add key-value attributes, and then use a analysis module that reads key-value attributes and acts on it. There are feature extraction modules in the system, that can scan raw data and pull out structured data (e.g., numbers). This data can be written as a key-value attribute. For example raw data can take upon the form: "[31 Mar 2010, 12:06 AM] Jon wrote this example". The system can use a regular expression to pull out the data and turn it into a single number representation (unix time). The system can add a metadata attribute called 'eventTime' with the numerical representation as its value.

Downstream, there could be a module that looks at this value and compares it against a threshold predicate. For example, a threshold predicate can be: "was 'eventtime' before 31 Mar?" Alternately, a histogramming module can use that value and determine the number of events that were on 31 Mar (and 30 Mar, and 1 Apr, etc). The example graphs shown in the examples of FIGS. 10E and 10F can be generated using this pattern.

In process 1502, attributes of the event is specified in a data model. An example of the data model is illustrated in FIG. 9. In one embodiment, the data model is extensible to add properties to the event as the dataset is streamed from the source to the sink. In addition, additional data fields can be appended to the data model in response to additional sources being added to the event. The attributes can include a priority, which can be specified by a logging system. If a machine is heavily loaded, some events can be prioritize over others, using the 'priority field'. For example, FATAL (highest priority) messages may skip ahead of line and be sent before lesser prioritized messages (e.g., ERROR or WARN priority messages). Also, if the system is, for example, running out of disk space, the DEBUG priority data can be erased before any of the INFO data gets erased, and INFO before WARN, etc. In addition, the attributes can include a source machine, a body, a time stamp, a metadata table, etc. Events will generally include each of these attributes but the body may have zero length and the metadata table may be empty.

In one embodiment, the timestamp can be a UNIX timestamp which is the time stamp from the source machine. The UNIX timestamp can be measured in milliseconds, for example. The timestamp may be a nanosecond timestamp, or any other monotonically increasing identifier which is a machine specific counter from the source machine. The priority field of the message can take on example values: TRACE, DEGBUG, INFO, WARN, ERROR, OR FATAL. In general, a logging system (e.g., syslog or log4j) provides the priority values. The source host can include a machine name or IP address. The body can include the raw log entry body. By default, the body can be truncated to a max of 32 KB per event. The max size can be reconfigured.

In one embodiment, event/message output to directories or files can be controlled based on the values of data model representing the event. For example, the system or any analytics being performed uses the timestamp to bucket the dataset based on time or date, specified by day of week, month, date and time, day of month, hour, minute, locale's equivalent of AM or PM, seconds, seconds since, year, etc. For example, when monitoring a web server, logs can be bucketed based on time, page hit, or the browser that is used, using extraction mechanisms. When tracking nodes, logs can be bucketed based on time and data node name, for example. In addition, the data group can be grouped based on a project identifier or person, for example, when tracking a feed of JIRA tickets from an apache feed.

In process 1504, the event described by the data model is annotated with key-value attribute pairs in a metadata table to enable analytic features to be performed on the dataset. In one embodiment, the metadata table includes a map from a string attribute name to an array of bytes. The metadata table can be used to specify routing of the event to multiple or different storage locations. In addition, the metadata table can be used to specify outputting of the dataset at the sink in multiple or different formats. The acktags, rolltags, and checksum tags/values are examples of values that use the metadata table. Metrics information generated by nodes can use the metadata table to store individual metrics. Any additional features can also utilize tag/values and the metadata table to allow new fields without rebuilding the program).

In process 1506, an event including a dataset that is streamed from a source to a sink via nodes is dynamically processed.

Figure 16:
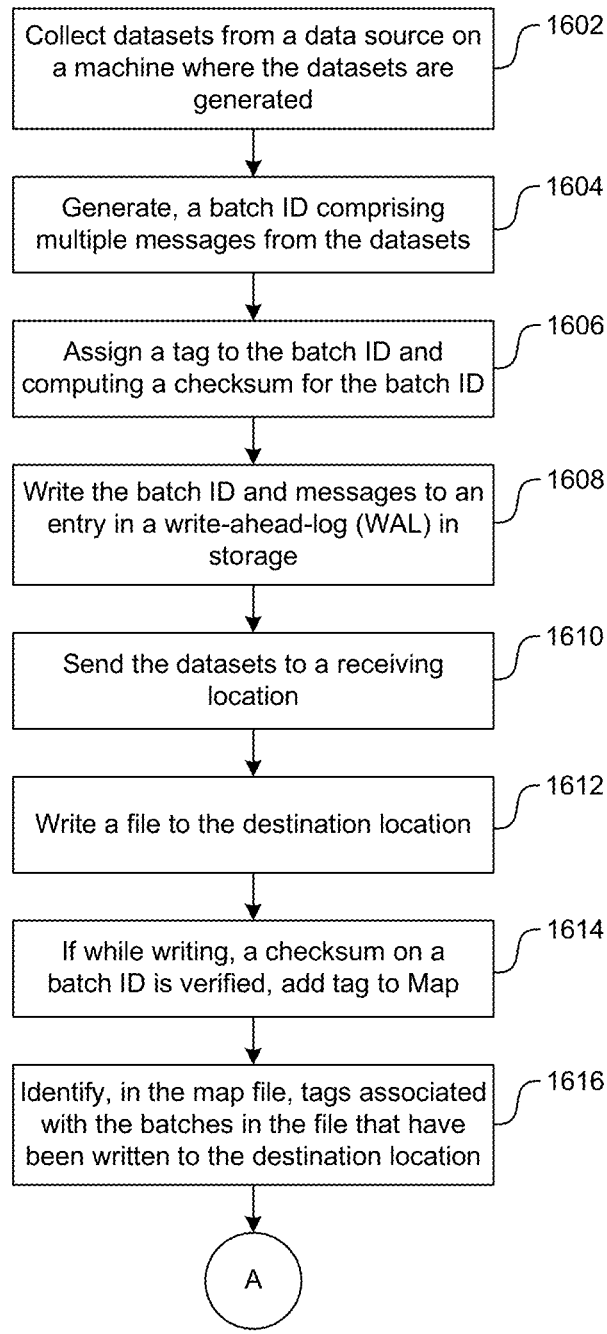
FIG. 16 depicts a flowchart of an example process for collecting and aggregating datasets for storage in a file system with fault tolerance.

FIG. 16 depicts a flowchart of an example process for collecting and aggregating datasets for storage in a file system with fault tolerance.

In process 1602, datasets are collected from a data source on a machine where the datasets are generated. The data can be collected from an agent node on the machine. In process 1604, a batch ID comprising multiple messages is generated from the datasets. In one embodiment, the agent node generates the batch ID. In process 1606, a tag is assigned to the batch ID and a checksum is computed for the batch, for example, also by the agent node.

In process 1608, the batch ID and messages are written to an entry in a write-ahead-log (WAL) in storage. The writing can be performed by the agent node. In one embodiment, the storage for the WAL is on the machine where the datasets are generated. In process 1610, the datasets are sent to a receiving location (e.g., a collector node). The data set on the agent can be sent when the size or time elapsed reaches a certain threshold.

In process 1612, a file is written to the destination location, for example, by the collector node. In process 1614, the tag is added to a map, in response to verifying the checksum of the batch of multiple messages at a known location (e.g., the master). The map can be associated with multiple tags assigned to multiple batches of messages from the datasets. In process 1616, tags associated with the batches in the file that have been written to the destination location are identified in the map. The process continues in the flow chart of FIG. 17.

Figure 17:
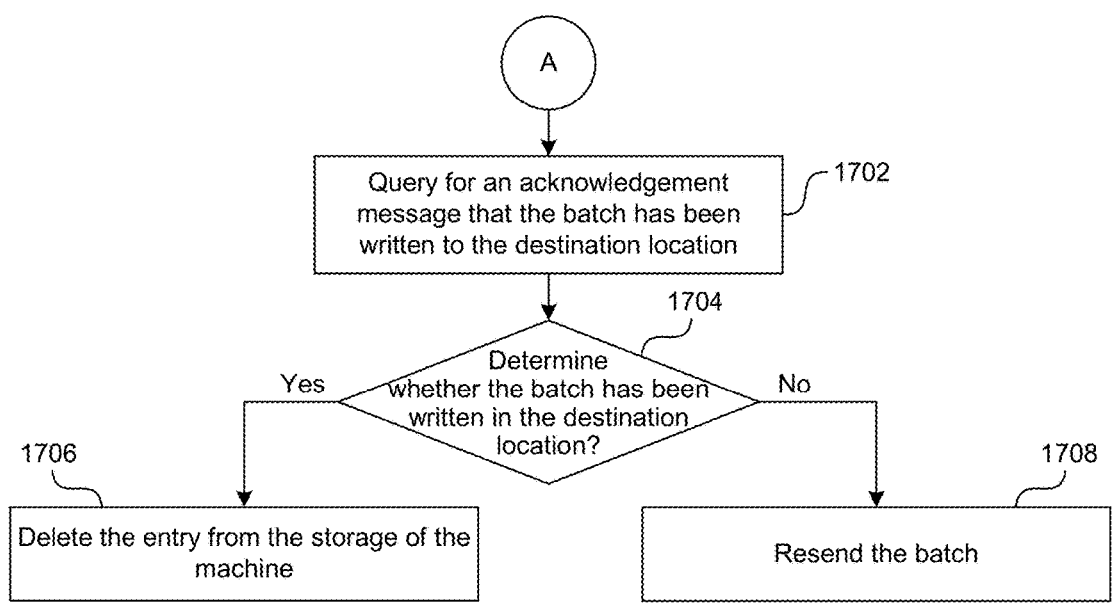
FIG. 17 depicts a flowchart of an example process for deleting the WAL in response to acknowledgement of receipt by the master.

FIG. 17 depicts a flowchart of an example process for deleting the WAL in response to acknowledgement of receipt by the master.

In process 1702, an acknowledgement message that the batch has been written to the destination location is queried for. In process 1704, it is determined whether the batch has been written in the destination location, which can be a storage tier comprising a distributed file system. If so, in process 1706, the entry is deleted from the storage of the machine. If not, in process 1708, the batch is resent.

Figure 18:
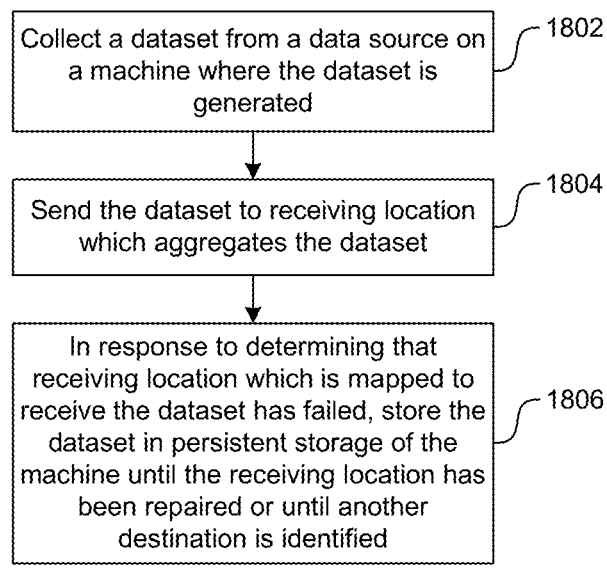
FIG. 18 depicts a flowchart of an example process for collecting and aggregating datasets with fault tolerance using a store on failure mechanism.

FIG. 18 depicts a flowchart of an example process for collecting and aggregating datasets with fault tolerance using a store on failure mechanism.

In process 1802, a dataset is collected from a data source on a machine where the dataset is generated.

In process 1804, the dataset is sent to a receiving location which aggregates the dataset. In one embodiment, the receiving location is a collector in a collector tier on the machine where the dataset is generated or another machine.

The receiving location may also be a file system in a storage tier comprised in one or more storage devices.

In process 1806, the dataset is stored in persistent storage of the machine until the receiving location has been repaired or until another destination is identified in response to determining that receiving location which is mapped to receive the dataset has failed.

FIG. 19 shows a diagrammatic representation of a machine 1900 in the example form of a computer system within which a set of instructions, for causing the machine to perform any one or more of the methodologies discussed herein, may be executed.

In the example of FIG. 19, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 19 reside in the interface.

In operation, the computer system 1900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A method for configuring a system to collect and aggregate datasets, wherein the system comprises agent nodes to collect the datasets, collector nodes to receive the datasets from the agent nodes, and master nodes configured to change a topology among the nodes in the system, the method being executed by a master node and comprising:
    identifying a data source from which a dataset is to be collected;
    configuring a machine that generates the dataset to send the dataset to the data source;
    identifying an arrival location where the dataset is to be aggregated;
    dynamically configuring, in response to system changes, an agent node in an agent tier based on the identified data source and arrival location; and
    dynamically configuring, in response to the system changes, a collector node in a collector tier based on the identified arrival location,
    wherein the agent node and the collector node function as peers in a peer-to-peer network.

2. The method of claim 1, wherein dynamically configuring the agent node in the agent tier comprises:
    specifying a source for the agent node as the identified data source in the system; and
    specifying a sink for the agent node as a collector source of a collector node in a collector tier.

3. The method of claim 1, wherein dynamically configuring the collector node in the collector tier comprises:
    specifying a collector source of the collector node in the collector tier as the identified arrival location; and
    specifying a collector sink of the collector node in the collector tier as a distributed file system in a storage tier.

4. The method of claim 1, wherein the dynamically configuring comprises:
    performing failover by changing a sink for the agent node to another collector source of another collector node when the original collector node fails; and
    performing fan-out increase by assigning the collector node to receive datasets from another collector node.

5. The method of claim 1, wherein the system changes comprise occurrence of one or more of: load imbalance, node failure, machine failure, new hardware, or a new collector node.

6. The method of claim 1, wherein the system includes multiple machines which generate datasets that are to be collected.

7. The method of claim 3, wherein the distributed file system includes the Hadoop distributed file system (HDFS).

8. The method of claim 1, wherein the agent node is configurable to perform analytics on the dataset.

9. The method of claim 1, further comprising launching a web page on a machine to access a master for the system using the master's universal resource locator (URL).

10. The method of claim 9, further comprising scaling the system by implementing multiple masters on multiple machines.

11. The method of claim 10, further comprising maintaining consistency among the multiple masters using a consensus protocol for ordered state changes.

12. The method of claim 11, wherein the ordered state changes include data flow configurations and node-to-machine mappings.

13. The method of claim 10, further comprising maintaining consistency among the multiple masters using a gossip protocol.

14. The method of claim 13, wherein the gossip protocol is used to maintain consistency among data including one or more of, node status updates, reporting information, and metrics information.

15. The method of claim 9, wherein configuration of the agent node is performed by accessing a link on the web page for the master.

16. The method of claim 1, wherein the data source includes, one or more of, a syslog port, an incoming network connection, and an IRC channel.

17. The method of claim 1, wherein the data source includes, a static file source.

18. The method of claim 1, wherein the data source includes, one or more of, a status update and a feed.

19. The method of claim 1, wherein the data source includes, output from execution of a program.

20. The method of claim 1, wherein the arrival location includes one or more of: a network connection, a physical disk, or a console.

21. A method for configuring a system having multiple machines to collect datasets from the multiple machines, wherein the system comprises agent nodes to collect the datasets, collector nodes to receive the datasets from the agent nodes, and master nodes configured to change a topology among the nodes in the system, the method being executed by a master node and comprising:
    identifying data sources on the multiple machines from where datasets are to be collected;
    configuring the multiple machines that generate the datasets to send the datasets to the data sources;
    identifying an arrival location where a dataset is to be aggregated; and
    providing an interface for accessing the master node to dynamically specify, in response to system changes, configurations for the multiple machines, the configurations including specified sources and sinks for agent nodes in an agent tier and collector nodes in a collector tier based on the identified data sources and the identified arrival location,
    wherein the agent nodes and the collector nodes function as peers in a peer-to-peer network.

22. The method of claim 21, wherein the specifying of configurations comprises:
    specifying sources for agent nodes in the agent tier as the identified data sources, wherein each agent node is associated with one of the multiple machines;

specifying a sink for each of the agent nodes in the agent tier as a collector source of a collector node in the collector tier.

23. The method of claim 22, wherein the specifying of configurations further comprises:
specifying the collector source of the collector node in the collector tier as the identified arrival location;
specifying a collector sink of the collector node as a distributed file system in a storage tier.

24. The method of claim 23, wherein at least one of the agent nodes of the agent tier or the collector nodes of the collector tier performs analytics on the datasets.

25. The method of claim 21, wherein the master is used to configure and dynamically reconfigure the agent nodes.

26. The method of claim 21, wherein statuses of the agent nodes are visible via the master.

27. The method of claim 21, further comprising launching a web page on a machine to access the master using the master's universal resource locator (URL);
wherein configuration of the agent nodes for the multiple machines is performed by accessing a link on the web page for the master.

28. The method of claim 21, further comprising configuring the sink to be a fan-out sink that sends incoming datasets to child sinks coupled to the sink for data replication or for splitting off a CPU intensive tap.

29. The method of claim 21, further comprising configuring the sink as a failover sink that specifies alternate collectors in case the collector fails.

30. The method of claim 29, wherein the sink is a failover sink that specifies a local disk to store data until the sink that has failed recovers.

31. A system to collect and aggregate datasets, the system comprising agent nodes to collect the datasets, collector nodes to receive the datasets from the agent nodes, and master nodes configured to change a topology among the nodes in the system, wherein a master node in the system has one or more processors configured to perform a method comprising:
identifying a data source from which a dataset is to be collected;
configuring a machine that generates the dataset to send the dataset to the data source;
identifying an arrival location where the dataset is to be aggregated;
dynamically configuring, in response to system changes, an agent node in an agent tier based on the identified data source and arrival location; and
dynamically configuring, in response to the system changes, a collector node in a collector tier based on the identified arrival location,
wherein the agent node and the collector node function as peers in a peer-to-peer network.

32. The system of claim 31, wherein dynamically configuring the agent node in the agent tier comprises:
specifying a source for the agent node as the identified data source in the system; and
specifying a sink for the agent node as a collector source of a collector node in a collector tier.

33. The system of claim 31, wherein dynamically configuring the collector node in the collector tier comprises:
specifying the collector source of the collector node in the collector tier as the identified arrival location; and
specifying a collector sink of the collector node in the collector tier as a distributed file system in a storage tier.

34. The system of claim 31, wherein the dynamically configuring comprises:
performing failover by changing a sink for the agent node to another collector source of another collector node when the collector node fails; and
performing fan-out increase by assigning the collector node to receive datasets from another collector node.

35. The system of claim 31, wherein the system changes comprise occurrence of one or more of: load imbalance, node failure, machine failure, new hardware, or a new collector node.

36. The system of claim 31, wherein the system includes multiple machines which generate datasets that are to be collected.

37. The system of claim 33, wherein the distributed file system includes the Hadoop distributed file system (HDFS).

38. The system of claim 31, wherein the agent node is configurable to perform analytics on the dataset.

39. The system of claim 31, the method further comprising launching a web page on a machine to access a master for the system using the master's universal resource locator (URL).

40. The system of claim 39, the method further comprising scaling the system by implementing multiple masters on multiple machines.

41. The system of claim 40, the method further comprising maintaining consistency among the multiple masters using a consensus protocol for ordered state changes.

42. The system of claim 41, wherein the ordered state changes include data flow configurations and node-to-machine mappings.

43. The system of claim 40, the method further comprising maintaining consistency among the multiple masters using a gossip protocol.

44. The system of claim 43, wherein the gossip protocol is used to maintain consistency among data including one or more of, node status updates, reporting information, and metrics information.

45. The system of claim 39, wherein configuration of the agent node is performed by accessing a link on the web page for the master.

46. The system of claim 31, wherein the data source includes, one or more of, a syslog port, an incoming network connection, and an IRC channel.

47. The system of claim 31, wherein the data source includes, a static file source.

48. The system of claim 31, wherein the data source includes, one or more of, a status update and a feed.

49. The system of claim 31, wherein the data source includes, output from execution of a program.

50. The system of claim 31, wherein the arrival location includes one or more of: a network connection, a physical disk, or a console.

* * * * *